(12) United States Patent
Shiomi

(10) Patent No.: US 9,812,078 B2
(45) Date of Patent: Nov. 7, 2017

(54) LIQUID CRYSTAL DISPLAY DEVICE

(71) Applicant: Sharp Kabushiki Kaisha, Osaka-shi, Osaka (JP)

(72) Inventor: Makoto Shiomi, Osaka (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 0 days.

(21) Appl. No.: 14/907,420

(22) PCT Filed: Apr. 2, 2014

(86) PCT No.: PCT/JP2014/059724
§ 371 (c)(1),
(2) Date: Jan. 25, 2016

(87) PCT Pub. No.: WO2015/040880
PCT Pub. Date: Mar. 26, 2015

(65) Prior Publication Data
US 2016/0171941 A1    Jun. 16, 2016

(30) Foreign Application Priority Data

Sep. 20, 2013 (JP) ................................ 2013-196030

(51) Int. Cl.
*G09G 3/36* (2006.01)
*G02F 1/1343* (2006.01)
(Continued)

(52) U.S. Cl.
CPC ..... *G09G 3/3607* (2013.01); *G02F 1/134336* (2013.01); *G02F 1/136286* (2013.01); *G09G 3/342* (2013.01); *G09G 3/3406* (2013.01); *G09G 3/3614* (2013.01); *G09G 3/3648* (2013.01); *G09G 2300/0447* (2013.01); *G09G 2300/0876* (2013.01); *G09G 2310/024* (2013.01)

(58) Field of Classification Search
CPC combination set(s) only.
See application file for complete search history.

(56) References Cited

U.S. PATENT DOCUMENTS 6,552,706 B1 * 4/2003 Ikeda ................... G09G 3/3607
                                                          345/100
7,804,548 B2 * 9/2010 Ishii ..................... G09G 3/3648
                                                          345/100

(Continued)

FOREIGN PATENT DOCUMENTS

JP        2007-114491 A    5/2007

OTHER PUBLICATIONS

JP2007114491 Japan May 2007 Kanazawa English Machine translation.*

*Primary Examiner* — Van Chow
(74) *Attorney, Agent, or Firm* — Steven Reiss

(57) ABSTRACT

Provided is a liquid crystal display device enabling display without reducing the resolution thereof with respect to an input video signal, and having a reduced number of scanning signal lines. Green first and third pixels (Gx1, Gy1), and a blue second pixel (B1) and a red fourth pixel (R1) are arranged in a Bayer array, the first pixel is connected to a first scanning signal line (Gn) and a first data signal line (Sm), and the second pixel is connected to the first scanning signal line (Gn) and the first data signal line (Sm).

10 Claims, 16 Drawing Sheets

(51) Int. Cl.
*G02F 1/1362* (2006.01)
*G09G 3/34* (2006.01)

(56) References Cited

U.S. PATENT DOCUMENTS

| | | | | |
|---|---|---|---|---|
| 2005/0206597 A1* | 9/2005 | Ishii | ............... | G09G 3/3688 345/87 |
| 2007/0109248 A1* | 5/2007 | Iisaka | ............... | G02F 1/136286 345/99 |
| 2012/0068916 A1* | 3/2012 | Tsubata | ............... | G02F 1/1362 345/94 |

* cited by examiner

FIG. 2

| | First Column | Second Column | Third Column | | | | m-th Column | |
|---|---|---|---|---|---|---|---|---|
| First Row | Gx | R | Gx | R | Gx | R | Gx | R |
| Second Row | B | Gy | B | Gy | B | Gy | B | Gy |
| Third Row | Gx | R | Gx | R | Gx | R | Gx | R |
| | B | Gy | B | Gy | B | Gy | B | Gy |
| | Gx | R | Gx | R | Gx | R | Gx | R |
| | B | Gy | B | Gy | B | Gy | B | Gy |
| | Gx | R | Gx | R | Gx | R | Gx | R |
| n-th Row | B | Gy | B | Gy | B | Gy | B | Gy |

FIG. 4
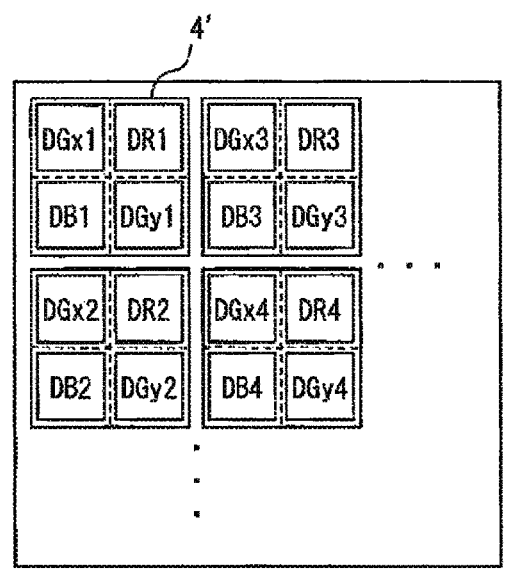
VIDEO DATA TO BE INPUT OF ONE FRAME
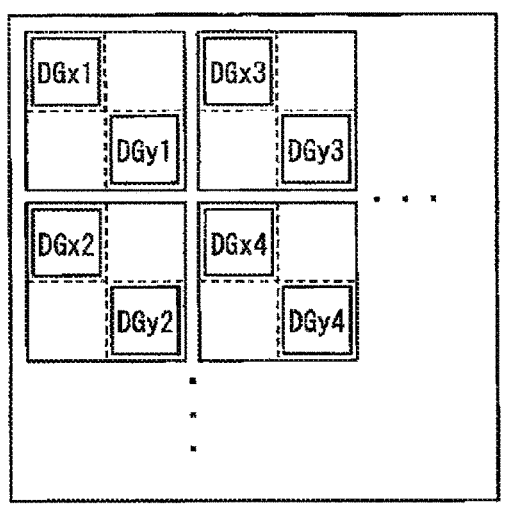
VIDEO DATA FOR FIRST FIELD
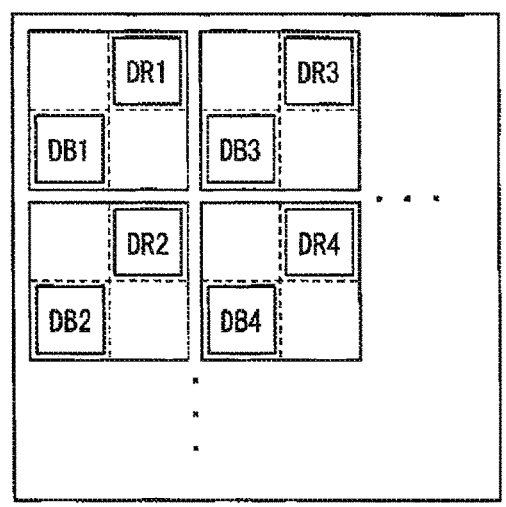
VIDEO DATA FOR SECOND FIELD

FIG. 5
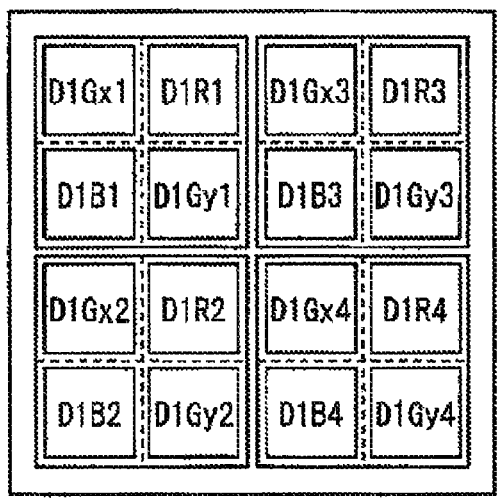
VIDEO DATA TO BE INPUT OF n-TH FRAME
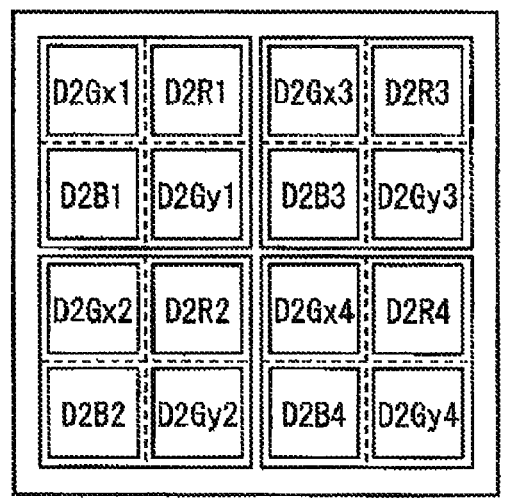
VIDEO DATA TO BE INPUT OF (n+1)TH FRAME
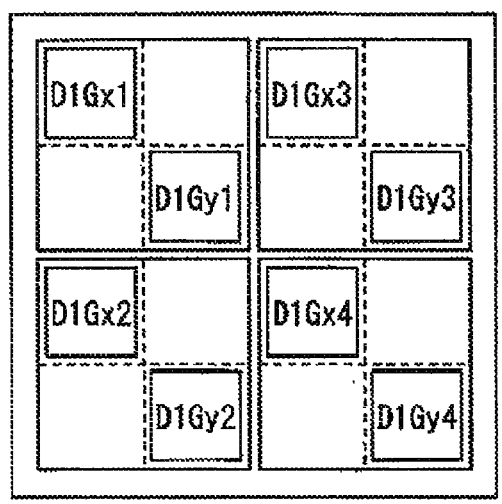
VIDEO DATA FOR FIRST FIELD
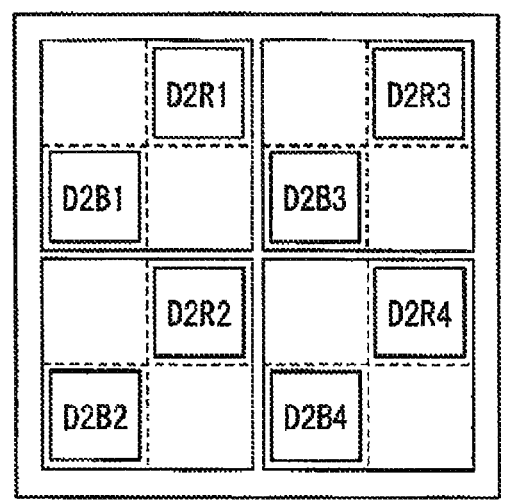
VIDEO DATA FOR SECOND FIELD

FIRST FIELD PERIOD

⇕

SECOND FIELD PERIOD

FIG. 12
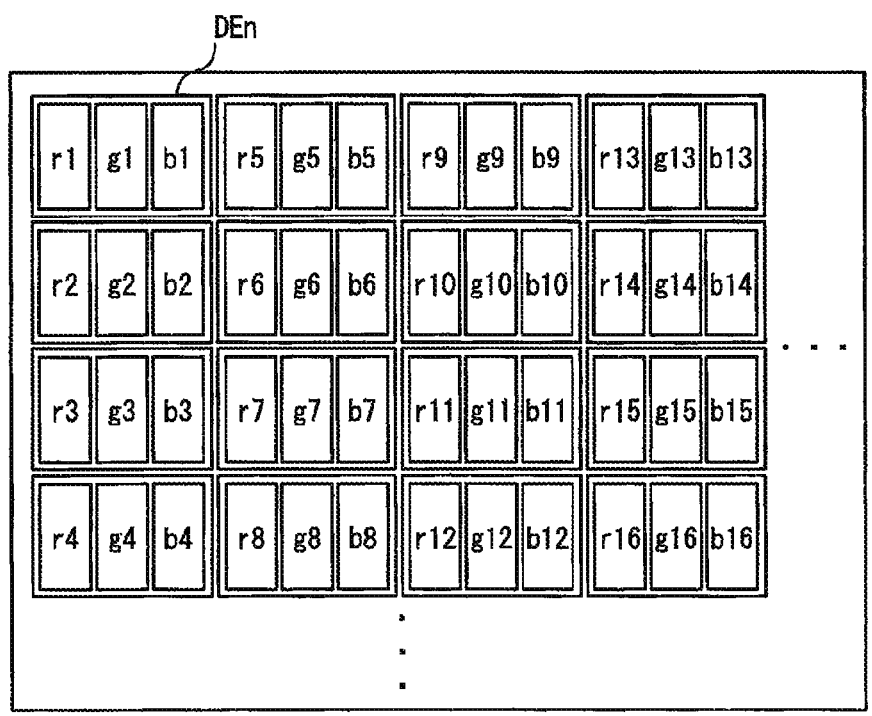
VIDEO DATA TO BE INPUT OF ONE FRAME
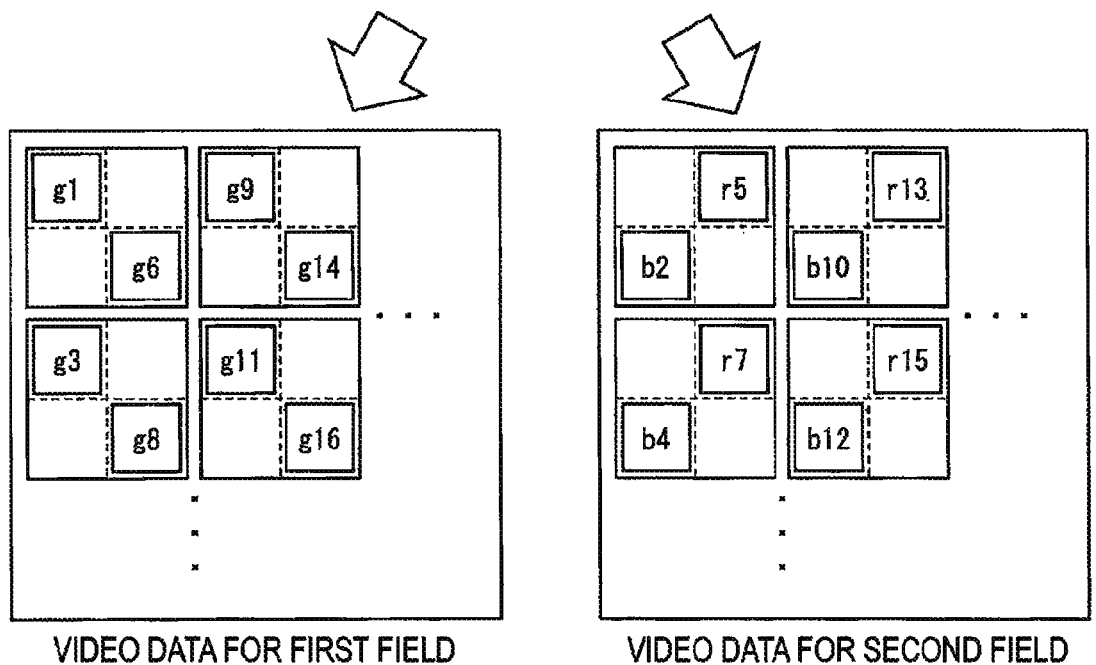
VIDEO DATA FOR FIRST FIELD   VIDEO DATA FOR SECOND FIELD FIG. 15
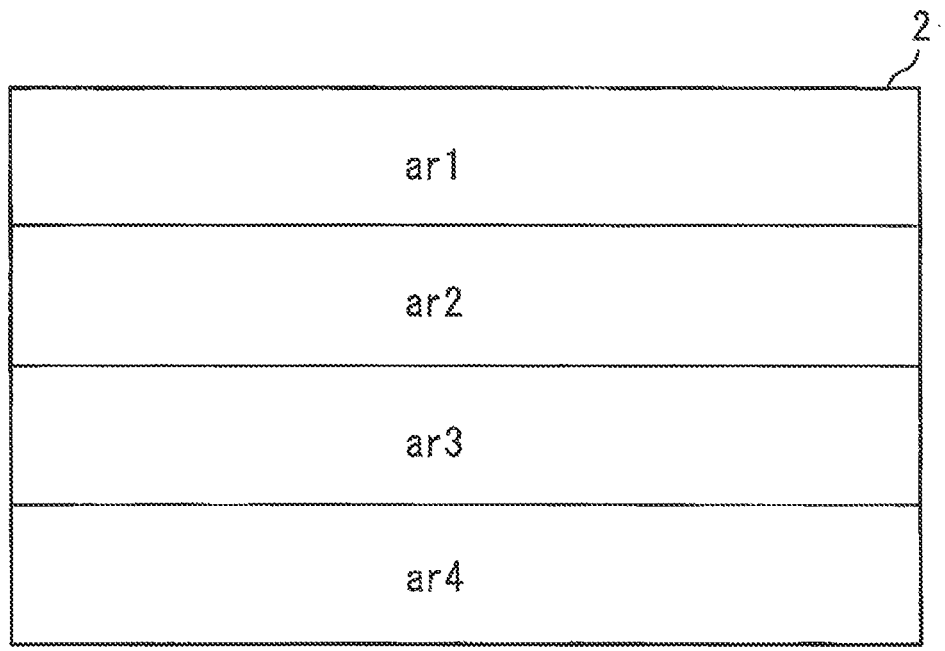
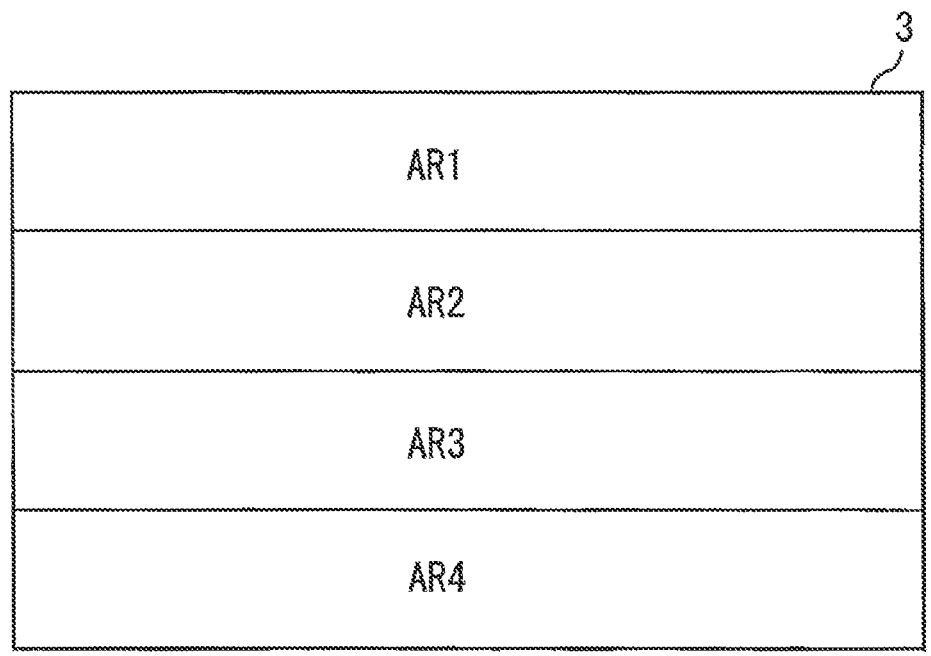

LIQUID CRYSTAL DISPLAY DEVICE

TECHNICAL FIELD

The present invention relates to a liquid crystal display device.

BACKGROUND ART

In display devices using an R sub-pixel, a G sub-pixel, and a B sub-pixel for colored display, various methods for arrangement of RGB pixels have been proposed.

As an example, so-called Bayer array is known in which G sub-pixels are arranged in a checkerboard pattern in a display area, and the R sub-pixels and the B sub-pixels are arranged in the checkerboard pattern in the other area of the display area.

As an example of the display device having the Bayer array, Patent Literature 1 discloses a display device having first and second pixels arranged in a checkerboard pattern, and providing alternate display corresponding to green (G) in the first pixels, and display corresponding to red (R) and blue (B) in the second pixels. The display device of Patent Literature 1 has the pixels of the Bayer array to achieve high definition.

CITATION LIST

Patent Literature

Patent Literature 1: JP 2007-114491 A (published on May 10, 2007)

SUMMARY OF INVENTION

Technical Problem

Recent rapid increase of definition and frequency of video also increases the number of vertical pixels of liquid crystal display devices for displaying video thereon, and as a result, the number of scanning signal lines has been increased.

The liquid crystal display devices and the display device of Patent Literature 1 have a problem of difficulty in mounting a scanning signal line drive circuit or insufficiently charging pixel rows (horizontally extending line) due to an increase in the number of scanning signal lines.

The present invention has been made in view of the above problems, and an object of the present invention is to provide a liquid crystal display device enabling display without reducing the resolution thereof with respect to an input video signal, and having a reduced number of scanning signal lines.

Solution to Problem

To solve the above problems, a liquid crystal display device according to one aspect of the present invention includes a direct-view liquid crystal panel having a Bayer array of green first and third pixels, and a blue second pixel and a red fourth pixel, the first pixel are connected to a first scanning signal line and a first data signal line through a first transistor, and the second pixel is connected to the first scanning signal line and the first data signal line through a second transistor.

Advantageous Effects of Invention

According to one aspect of the present invention, the liquid crystal display device can be provided which enables display without reducing the resolution thereof with respect to an input video signal, and has a reduced number of scanning signal lines.

BRIEF DESCRIPTION OF DRAWINGS

FIG. 2 is a plan view illustrating a pixel array of the liquid crystal panel according to the first embodiment.

FIG. 4 is a schematic diagram illustrating data processing in an input data processing circuit according to the first embodiment.

FIG. 5 is a schematic diagram illustrating another example of the data processing in the input data processing circuit according to the first embodiment.

FIG. 10(a) illustrates a pixel array of the liquid crystal display device according to the first embodiment, and FIG. 10(b) illustrates a pixel array of a conventional liquid crystal display device.

FIG. 11(a) illustrates luminances of a bright pixel and a dark pixel of the liquid crystal display device according to the first embodiment, and FIG. 11(b) illustrates luminances of a bright pixel and a dark pixel of a conventional liquid crystal display device.

FIG. 12 is a schematic diagram illustrating data processing in an input data processing circuit according to a second embodiment.

FIG. 15 is a plan view illustrating a liquid crystal panel and a backlight according to a fourth embodiment.

DESCRIPTION OF EMBODIMENTS

First Embodiment

An embodiment of the present invention will be described in detail below based on FIGS. 1 to 11(b).

Figure 1:
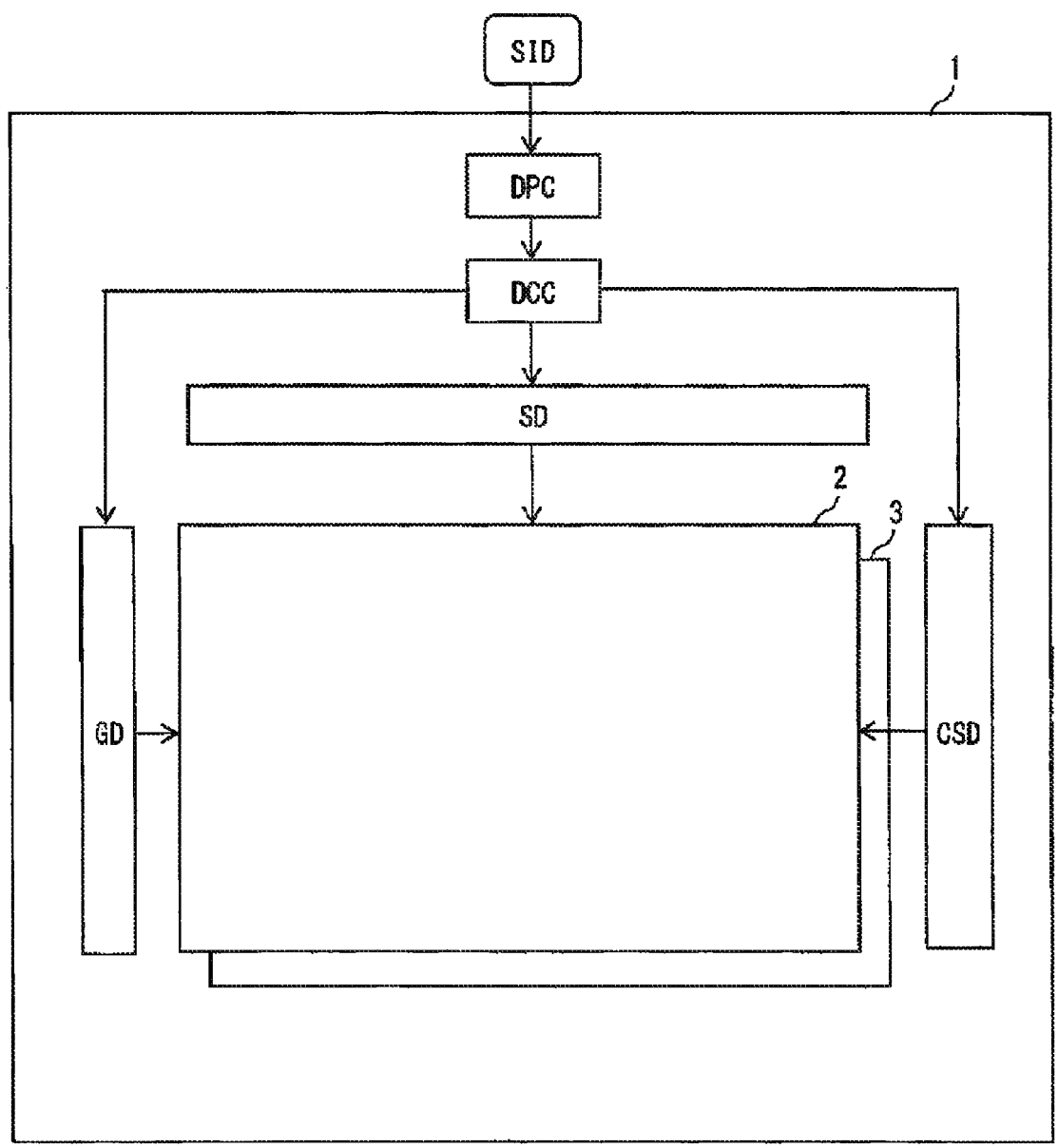
FIG. 1 is a block diagram illustrating a configuration of a liquid crystal display device according to a first embodiment.

FIG. 1 is a block diagram illustrating a configuration of a liquid crystal display device according to the present embodiment.

As illustrated in FIG. 1, the liquid crystal display device 1 includes a direct-view liquid crystal panel 2, a backlight 3 disposed opposite to the liquid crystal panel 2, an input data processing circuit DPC, a display control circuit DCC, a source driver SD, a gate driver GD, and a CS driver CSD.

Video data SID to be input, as luminance information of pixels of the liquid crystal panel 2, is supplied to the input data processing circuit DPC from outside, and the input data processing circuit DPC supplies video data extracted from the video data SID to be input, to the display control circuit DCC.

The display control circuit DCC generates a control signal based on the video data, and supplies the control signal to the source driver SD, the gate driver GD, and the CS driver CSD.

Based on the control signal, the source driver SD drives a plurality of data signal lines of the liquid crystal panel 2, the gate driver GD drives a plurality of scanning signal lines of the liquid crystal panel 2, and the CS driver CSD drives a plurality of auxiliary capacitor lines of the liquid crystal panel 2. The backlight 3 emits light toward the liquid crystal panel 2.

<Pixel Array>

FIG. 2 is a plan view illustrating a pixel array of the liquid crystal panel according to the present embodiment.

The liquid crystal panel 2 includes a plurality of pixels arranged in a Bayer array of n rows×m columns. Specifically, one pixel unit 4 includes a pixel Gx (first pixel) and a pixel Gy (third pixel) for displaying green (G), a pixel B (second pixel) for displaying blue (B), and a pixel R (fourth pixel) for displaying red (R) and the pixel units 4 are arranged in a matrix in the liquid crystal panel 2.

In the whole of the liquid crystal panel 2, the pixels Gx and the pixels Gy are arranged in a staggered pattern (checkerboard pattern), and at places without the arrangement of the pixel Gx and the pixel Gy, the pixels B and the pixels R are arranged in a staggered pattern (checkerboard pattern). That is, pixels Gx and the pixels B are alternately arranged in odd columns, the pixels R and the pixels Gy are alternately arranged in even columns, the pixels Gx and the pixels R are alternately arranged in odd rows, and the pixels B and the pixels Gy are alternately arranged in even rows.

As long as the above-mentioned conditions of the pixel array are satisfied, arrangement of the pixels in one pixel unit is not limited, but in the following, description will be made assuming that the pixel Gx, the pixel B, the pixel Gy, and the pixel R are arranged counterclockwise in this order in one pixel unit 4.

The liquid crystal panel 2 includes a color filter, not illustrated, for colored display. Specifically, a color filter G transmitting green light is provided corresponding to the pixel Gx and the pixel Gy, a color filter B transmitting blue light is provided corresponding to the pixel B, and a color filter R transmitting red light is provided corresponding to the pixel R.

<Pixel Configuration>

Figure 3:
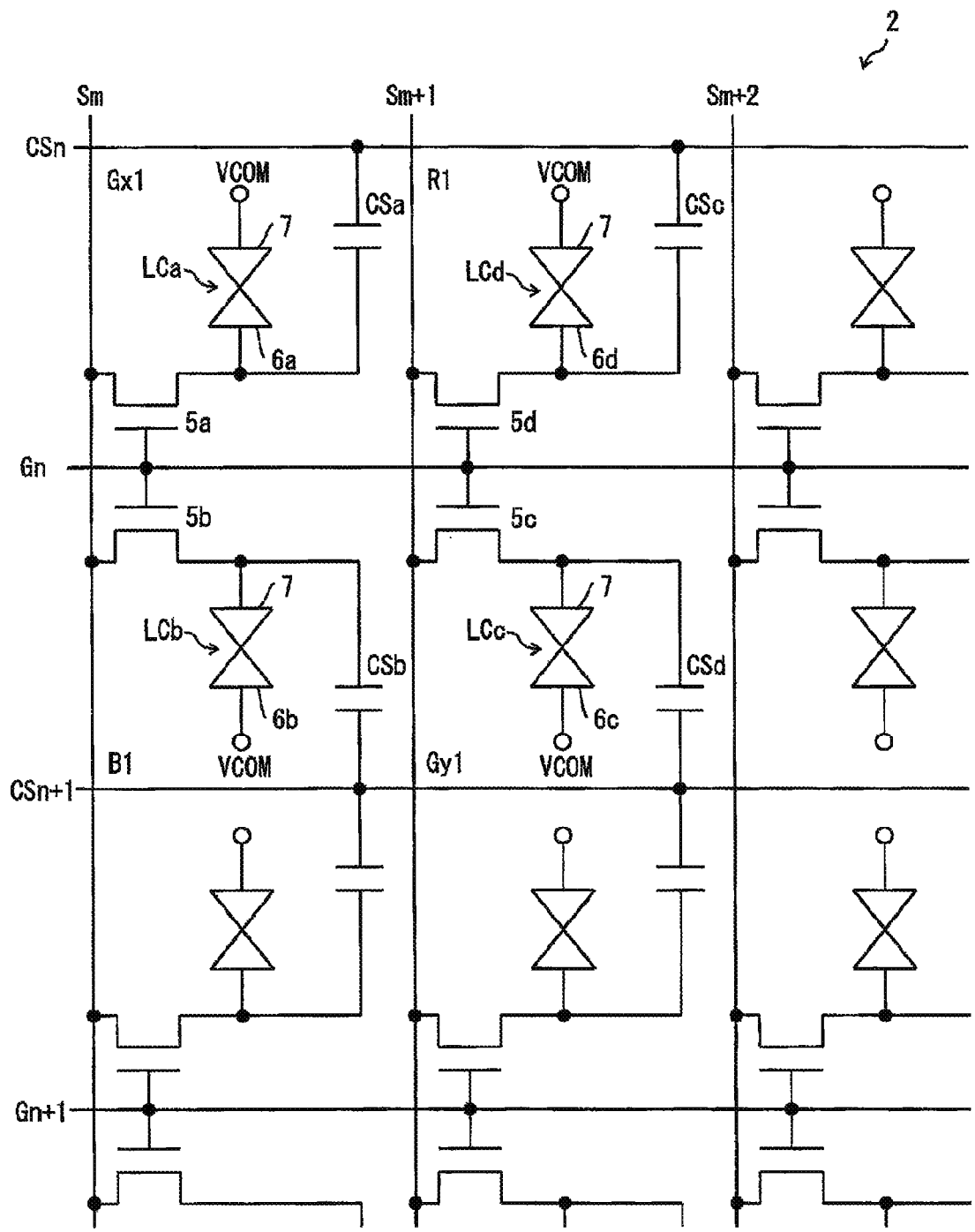
FIG. 3 is a circuit diagram illustrating a pixel configuration of the liquid crystal panel according to the first embodiment.

FIG. 3 is a circuit diagram illustrating a pixel configuration of the liquid crystal panel according to the present embodiment.

The liquid crystal panel 2 includes the plurality of data signal lines Sm, Sm+1, Sm+2, . . . extending vertically, the plurality of scanning signal lines Gn, Gn+1, . . . extending horizontally, and the plurality of auxiliary capacitor lines CSn, CSn+1, . . . extending horizontally. The scanning signal lines and the auxiliary capacitor lines are alternately provided.

An area enclosed by two adjacent data signal lines and adjacent scanning signal line and auxiliary capacitor line corresponds to one pixel.

Specifically, in FIG. 3, an area enclosed by the data signal line Sm, the data signal line Sm+1, the scanning signal line Gn, and the auxiliary capacitor line CSn corresponds to a pixel Gx1. An area enclosed by the data signal line Sm, the data signal line Sm+1, the scanning signal line Gn, and the auxiliary capacitor line CSn+1 corresponds to a pixel B1. An area enclosed by the data signal line Sm+1, the data signal line Sm+2, the scanning signal line Gn, and the auxiliary capacitor line CSn corresponds to a pixel R1. An area enclosed by the data signal line Sm+1, the data signal line Sm+2, the scanning signal line Gn, and the auxiliary capacitor line CSn+1 corresponds to a pixel Gy1.

In FIG. 3, the pixel Gx1 (first pixel) is provided with a pixel electrode 6a and a transistor 5a (first transistor), and the pixel Gx1 is connected to the scanning signal line Gn (first scanning signal line) and the data signal line Sm (first data signal line) through the transistor 5a. The pixel B1 (second pixel) is provided with a pixel electrode 6b and a transistor 5b (second transistor), and the pixel B1 is connected to the scanning signal line Gn (first scanning signal line) and the data signal line Sm (first data signal line) through the transistor 5b. The pixel Gy1 (third pixel) is provided with a pixel electrode 6c and a transistor 5c (third transistor), and the pixel Gy1 is connected to the scanning signal line Gn (first scanning signal line) and the data signal line Sm+1 (second data signal line) through the transistor 5c. The pixel R1 (fourth pixel) is provided with a pixel electrode 6d and a transistor 5d (fourth transistor), and the pixel R1 is connected to the scanning signal line Gn (first scanning signal line) and the data signal line Sm+1 (second data signal line) through the transistor 5d.

Further, in FIG. 3, the transistor 5a has a gate terminal connected to the scanning signal line Gn, a source terminal connected to the data signal line Sm, and a drain terminal connected to the pixel electrode 6a. The transistor 5b has a gate terminal connected to the scanning signal line Gn, a source terminal connected to the data signal line Sm, and a drain terminal connected to the pixel electrode 6b. The transistor 5c has a gate terminal connected to the scanning signal line Gn, a source terminal connected to the data signal line Sm+1, and a drain terminal connected to the pixel electrode 6c. The transistor 5d has a gate terminal connected to the scanning signal line Gn, a source terminal connected to the data signal line Sm+1, and a drain terminal connected to the pixel electrode 6d.

Further, the pixel Gx1 includes a liquid crystal capacitor LCa including the pixel electrode 6a, a common electrode 7, and a liquid crystal layer held between the pixel electrode 6a and the common electrode 7, the pixel B1 includes a liquid crystal capacitor LCb including the pixel electrode 6b, the common electrode 7, and a liquid crystal layer held between the pixel electrode 6b and the common electrode 7, the pixel Gy1 includes a liquid crystal capacitor LCc including the pixel electrode 6c, the common electrode 7, and a liquid crystal layer held between the pixel electrode 6c and the common electrode 7, and the pixel R1 includes a liquid crystal capacitor LCd including the pixel electrode 6d, the common electrode 7, and a liquid crystal layer held between the pixel electrode 6d and the common electrode 7

The liquid crystal panel 2 supplies data signals to the pixel electrodes of the pixels thorough the data signal lines, and controls light transmittance of the liquid crystal layers of the pixels for display.

Further, an auxiliary capacitor CSa is formed between the pixel electrode 6a and the auxiliary capacitor line CSn (first auxiliary capacitor line), an auxiliary capacitor CSb is formed between the pixel electrode 6b and the auxiliary capacitor line CSn+1 (second auxiliary capacitor line), an auxiliary capacitor CSc is formed between the pixel electrode 6c and the auxiliary capacitor line CSn+1, and an auxiliary capacitor CSd is formed between the pixel electrode 6d and the auxiliary capacitor line CSn, <Driving Method>

(Extraction of Image Data)

In the present embodiment, a driving method for the liquid crystal display device 1 will be described, the driving method is performed upon supplying the video data SID to be input including the pixel data sets arranged in the Bayer array to the input data processing circuit DPC.

FIG. 4 is a schematic diagram illustrating data processing in an input data processing circuit according to the present embodiment.

As illustrated in FIG. 4, the video data SID to be input includes a plurality of pixel data units 4' arranged in a matrix, and the pixel data units 4' include pixel data sets DGxn, DGyn, DBn, and DRn. The pixel data units 4' correspond to the pixel units 4 of the liquid crystal panel 2, respectively, and the pixel data sets of one pixel data unit 4' correspond to luminance information of the pixels of one pixel unit 4.

The input data processing circuit DPC divides the video data SID to be input of one frame into two video data sets, and supplies, to the display control circuit DCC, each of the divided video data sets as video data for each field.

Specifically, as illustrated in FIG. 4, the input data processing circuit DPC extracts, from the pixel data sets of one frame included in the video data SID to be input, the pixel data sets DGxn (DGx1, DGx2, DGx3, . . . ) and DGyn (DGy1, DGy2, DGy3, . . . ) positioned in the checkerboard pattern, and supplies, to the display control circuit DCC, the extracted pixel data sets as video data for a first field. Further, the input data processing circuit DPC supplies, to the display control circuit DCC, the remaining pixel data sets DBn (DB1, DB2, DB3, . . . ) and DRn (DR1, DR2, DR3, . . . ) of the pixel data of one frame, not extracted as the video data for the first field, as video data for a second field.

Therefore, the liquid crystal display device 1 controls luminances of the pixels in field periods to display an image corresponding to the video data SID to be input of one frame.

Note that DBn and DRn may be employed as the video data for the first field, and DGxn and DGyn may be employed as the video data for the second field.

Further, although not illustrated, the video data for the first field and the video data for the second field may be extracted from pixel data of an odd frame, and a video data block may not be extracted from pixel data of an even frame. The above-mentioned data processing can reduce a burden on each circuit such as the input data processing circuit DPC or the display control circuit DCC.

FIG. 5 is a schematic diagram illustrating data processing in the input data processing circuit according to the present embodiment.

The input data processing circuit DPC may perform data processing as illustrated in FIG. 5. That is, the input data processing circuit DPC extracts, from the pixel data included in the video data SID to be input of the n-th frame, pixel data sets D1Gxn and D1Gyn positioned in a checkerboard pattern, and supplies, to the display control circuit DCC, the extracted pixel data sets as the video data for the first field. Further, the input data processing circuit DPC extracts, from the pixel data included in the video data SID to be input of the (n+1)th frame, pixel data sets D2Bn and D2Rn positioned in a checkerboard pattern, and supplies, to the display control circuit DCC, the extracted pixel data as the video data for the second field.

The above-mentioned data processing can reduce a burden on each circuit such as the input data processing circuit DPC or the display control circuit DCC.

(Timing Chart)

Figure 6:
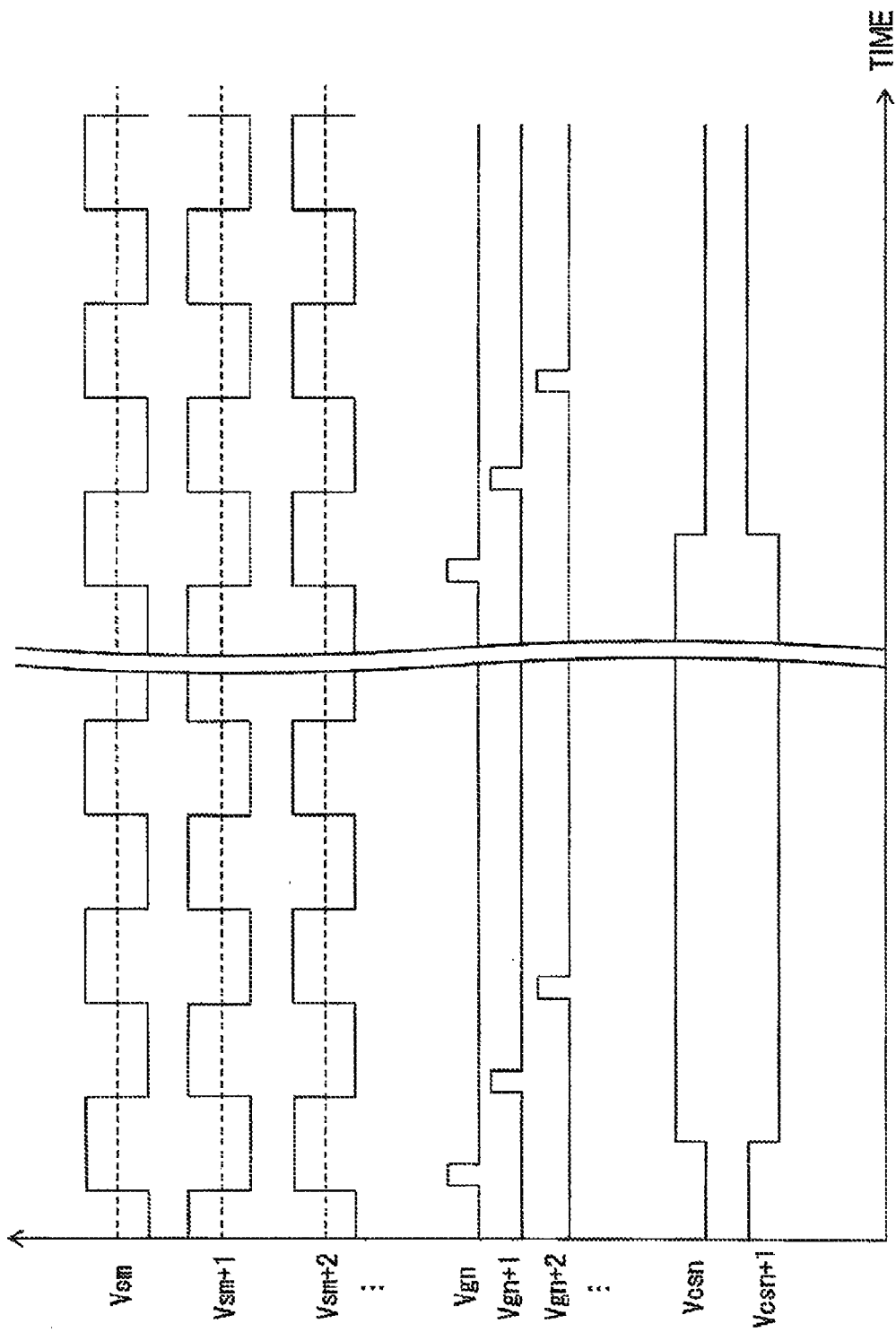
FIG. 6 is a timing chart illustrating electric potential of scanning signal lines, polarities of data signals, and electric potential of auxiliary capacitor lines in the n-th vertical scanning period.
Figure 7:
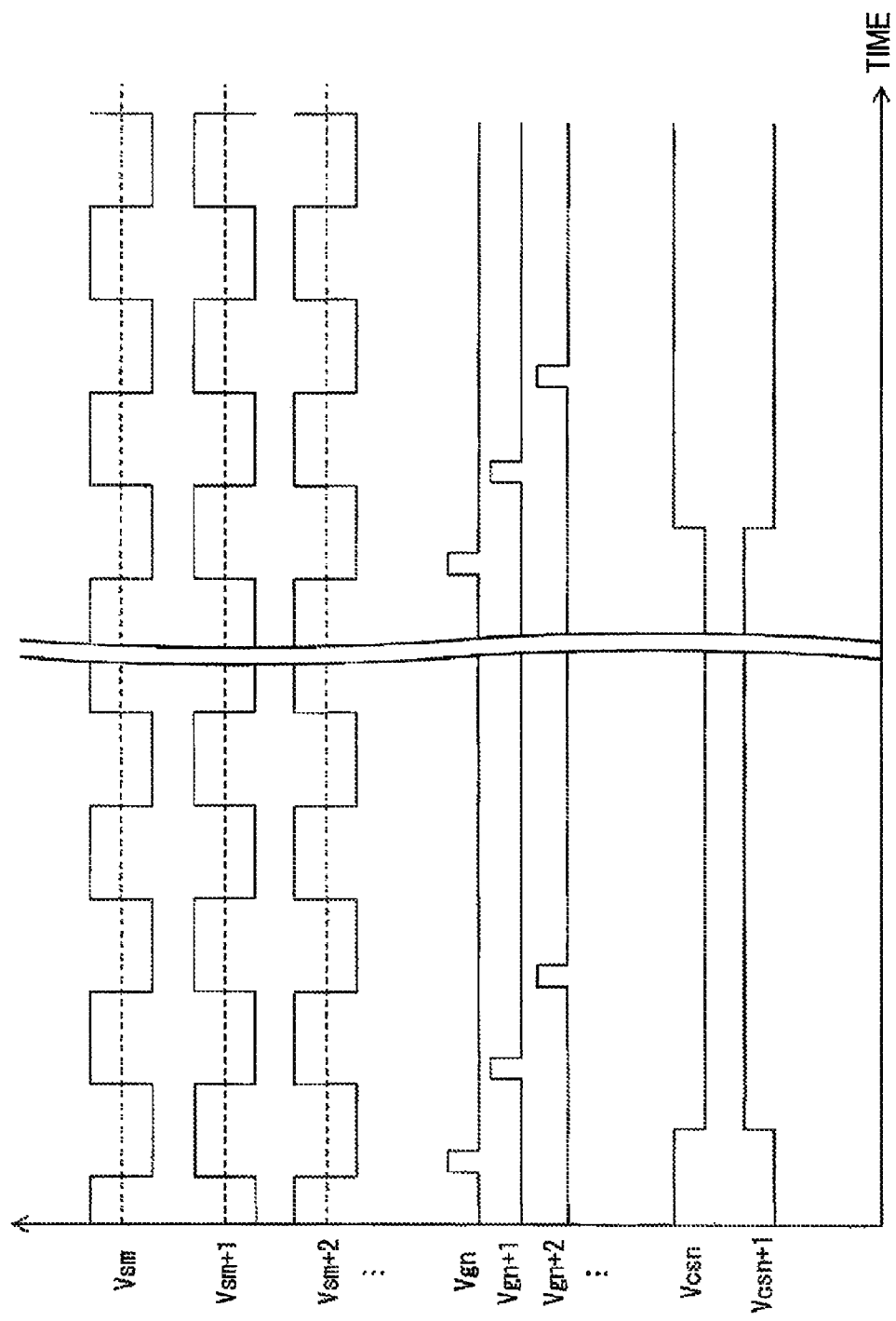
FIG. 7 is a timing chart illustrating electric potential of scanning signal lines, polarities of data signals, and electric potential of auxiliary capacitor lines in the (n+1)th vertical scanning period.

FIG. 6 is a timing chart illustrating electric potential of the scanning signal lines, polarities of the data signals, and electric potential of auxiliary capacitor lines in the n-th vertical scanning period. FIG. 7 is a timing chart illustrating electric potential of the scanning signal lines, polarities of the data signals, and electric potential of the auxiliary capacitor lines in the (n+1)th vertical scanning period.

In FIGS. 6 and 7, an electric potential of the scanning signal line Gn is defined as Vgn, a polarity of the data signal supplied through the data signal line Sm is defined as Vsm, and an electric potential of the auxiliary capacitor line CSn is defined as Vcsn.

As illustrated in FIGS. 6 and 7, the polarity of the data signal and the electric potential of the auxiliary capacitor line CSn are reversed every vertical scanning period. Further, the polarity of the data signal supplied to an adjacent data signal line is reversed every 1 H (horizontal scanning period).

Note that electric potential of the auxiliary capacitor lines CSn+2, CSn+4, . . . are equal to the electric potential of the auxiliary capacitor line CSn, and electric potential of the auxiliary capacitor lines CSn+1, CSn+3, CSn+5, . . . have an opposite phase to the electric potential of the auxiliary capacitor line CSn. A cycle of reversing the electric potential of the auxiliary capacitor line can be appropriately set to for example 12 H or 24 H.

Figure 8:
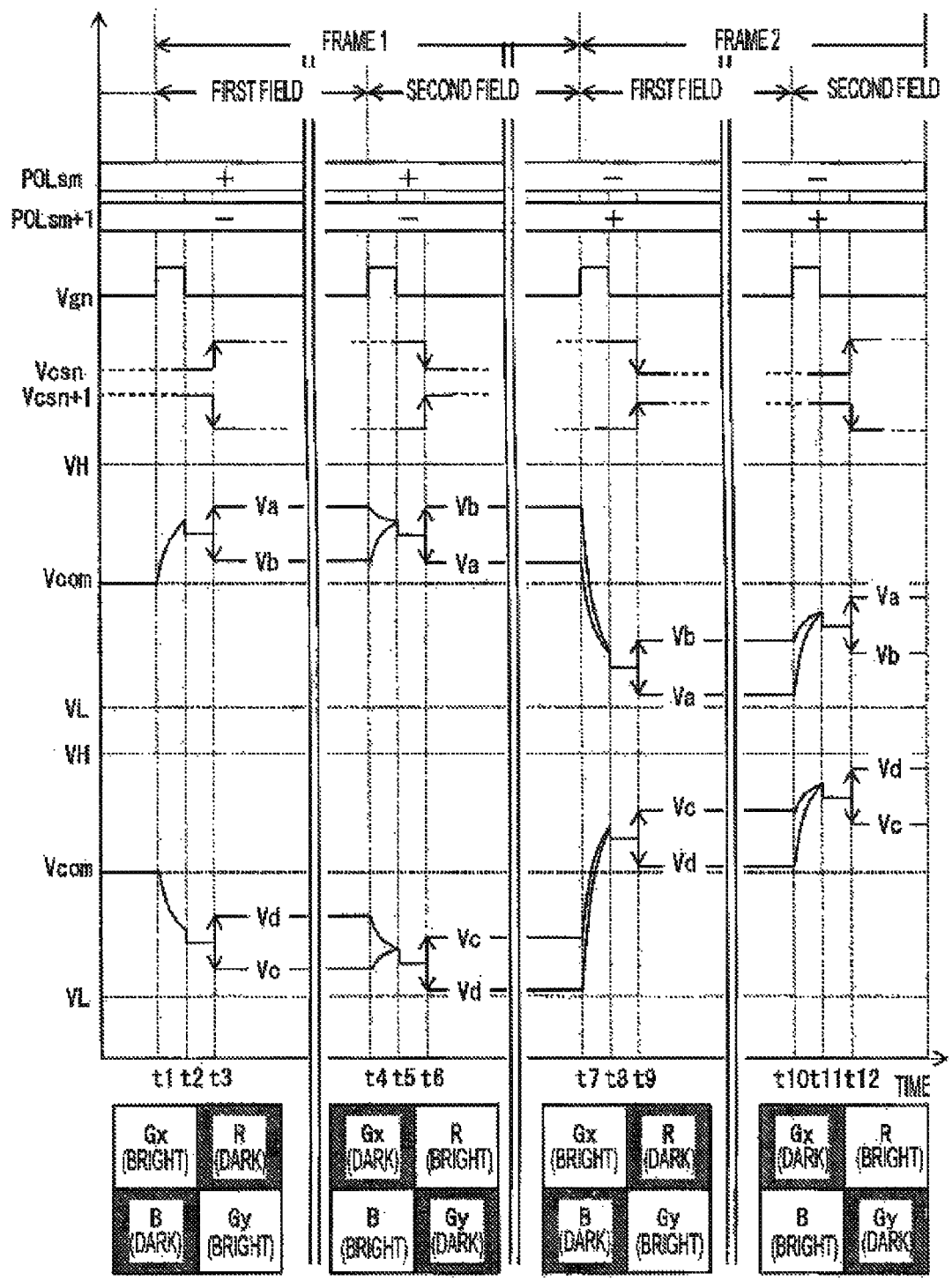
FIG. 8 is a timing chart illustrating a driving method focusing on one pixel unit, and diagrams illustrating brightness of pixels.

FIG. 8 is a timing chart illustrating the driving method focusing on one pixel unit, and diagrams illustrating brightness of pixels.

In FIG. 8, the polarity of the data signal supplied through the data signal line Sm is defined as POLsm, and the polarity of the data signal supplied through the data signal line Sm+1 is defined as POLsm+1. Further, an electric potential of the pixel electrode 6a is defined as Va, an electric potential of the pixel electrode 6b is defined as Vb, an electric potential of the pixel electrode 6c is defined as Vc, and an electric potential of the pixel electrode 6d is defined as Vd.

In each field period, the polarity of the data signal of each of the data signal lines Sm, Sm+1, and Sm+2 is reversed every 1 H (horizontal scanning period), in the same horizontal scanning period, the polarity of the data signal is differed between the data signal lines Sm and Sm+2 and the data signal line Sm+1, and a cycle of reversing the polarity of the data signal transmitted through the data signal line Sm and the cycle of reversing the electric potential of the auxiliary capacitor line CSn are shifted by 0.5 V (vertical scanning period).

Thus, in a field period being half of one frame period, brightness of the pixels can be controlled as described below.

In a first field period of a frame 1, the scanning signal line Gn is selected at t1, the same data signal having a positive polarity is written to the pixel electrodes 6a and 6b through the data signal line Sm, the same data signal having a negative polarity is written to the pixel electrodes 6c and 6d through the data signal line Sm+1, and the selection ends at t2 (pull-in potential is generated in the pixel electrodes). The data signal written to the pixel electrodes 6a and 6b is a data signal generated by the source driver SD based on the pixel data set DGxn extracted by the input data processing circuit DPC, and the data signal written to the pixel electrodes 6c and 6d is a data signal generated by the source driver SD based on pixel data set DGyn extracted by the input data processing circuit DPC. Then, the electric potential of the auxiliary capacitor line CSn is raised up and the electric potential of the auxiliary capacitor line CSn+1 is dropped down at t3 to raise up the electric potential of the pixel electrodes 6a and 6d and drop down the electric potential of the pixel electrodes 6b and 6c.

In a second field period of the frame 1, the scanning signal line Gn is selected at t4, the same data signal having a positive polarity is written to the pixel electrodes 6a and 6b through the data signal line Sm, the same data signal having a negative polarity is written to the pixel electrodes 6c and 6d through the data signal line Sm+1, and the selection ends at t5 (pull-in potential is generated in the pixel electrodes). The data signal written to the pixel electrodes 6a and 6b is a data signal generated by the source driver SD based on pixel data set Bn extracted by the input data processing circuit DPC, and the data signal written to the pixel electrodes 6c and 6d is a data signal generated by the source driver SD based on pixel data set Rn extracted by the input data processing circuit DPC. Then, the electric potential of the auxiliary capacitor line CSn is dropped down and the electric potential of the auxiliary capacitor line CSn+1 is raised up at t6 to drop down the electric potential of the pixel electrodes 6a and 6d and raise up the electric potential of the pixel electrodes 6b and 6c.

In a first field period of a frame 2, the scanning signal line Gn is selected at t7, the same data signal having a negative polarity is written to the pixel electrodes 6a and 6b through the data signal line Sm, the same data signal having a positive polarity is written to the pixel electrodes 6c and 6d through the data signal line Sm+1, and the selection ends at t8 (pull-in potential is generated in the pixel electrodes). The data signal written to the pixel electrodes 6a and 6b is a data signal generated by the source driver SD based on the pixel data set DGxn+1 extracted by the input data processing circuit DPC, and the data signal written to the pixel electrodes 6c and 6d is a data signal generated by the source driver SD based on pixel data set DGyn+1 extracted by the input data processing circuit DPC. Then, the electric potential of the auxiliary capacitor line CSn is dropped down and the electric potential of the auxiliary capacitor line CSn+1 is raised up at t9 to drop down the electric potential of the pixel electrodes 6a and 6d and raise up the electric potential of the pixel electrodes 6b and 6c.

In a second field period of the frame 2, the scanning signal line Gn is selected at t10, the same data signal having a negative polarity is written to the pixel electrodes 6a and 6b through the data signal line Sm, the same data signal having a positive polarity is written to the pixel electrodes 6c and 6d through the data signal line Sm+1, and the selection ends at t11 (pull-in potential is generated in the pixel electrodes).

The data signal written to the pixel electrodes 6a and 6b is a data signal generated by the source driver SD based on pixel data set Bn+1 extracted by the input data processing circuit DPC, and the data signal written to the pixel electrodes 6c and 6d is a data signal generated by the source driver SD based on pixel data set Rn+1 extracted by the input data processing circuit DPC. Then, the electric potential of the auxiliary capacitor line CSn is raised up and the electric potential of the auxiliary capacitor line CSn+1 is dropped down at t12 to raise up the electric potential of the pixel electrodes 6a and 6d and drop down the electric potential of the pixel electrodes 6b and 6c.

Owing to the above-mentioned driving method, the first field period and the second field period are alternately repeated. The first field period is a period in which the luminance of the pixel Gx is higher than the luminance of the pixel B, and the luminance of the pixel Gy is higher than the luminance of the pixel R. The second field period is a period in which the luminance of the pixel B is higher than the luminance of the pixel Gx, and the luminance of the pixel R is higher than the luminance of the pixel Gy.

In the following, the pixels Gx and Gy in the first field period are defined as a bright pixel, the pixels B and R in the first field period are defined as a dark pixel, the pixels Gx and Gy in the second field period are defined as the dark pixel, and the pixels B and R in the second field period are defined as the bright pixel.

Figure 9:
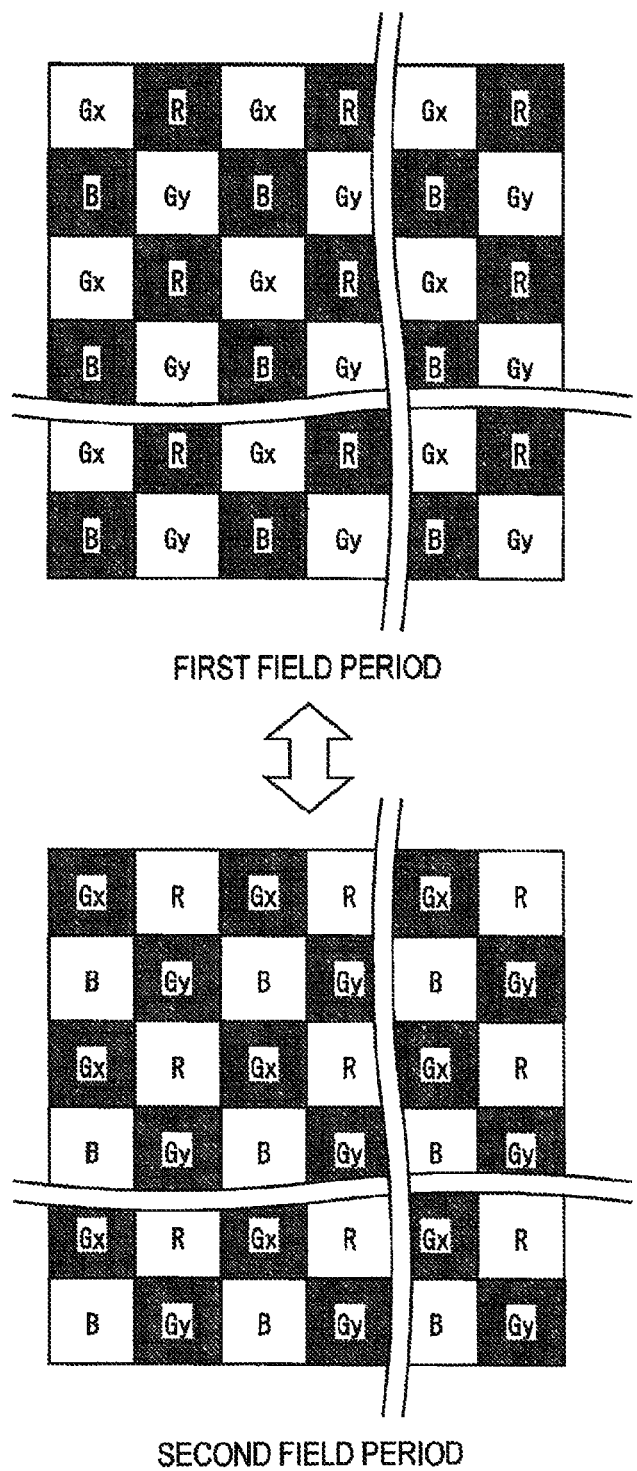
FIG. 9 is a schematic diagram illustrating brightness of pixels of a liquid crystal panel.
Figure 10:
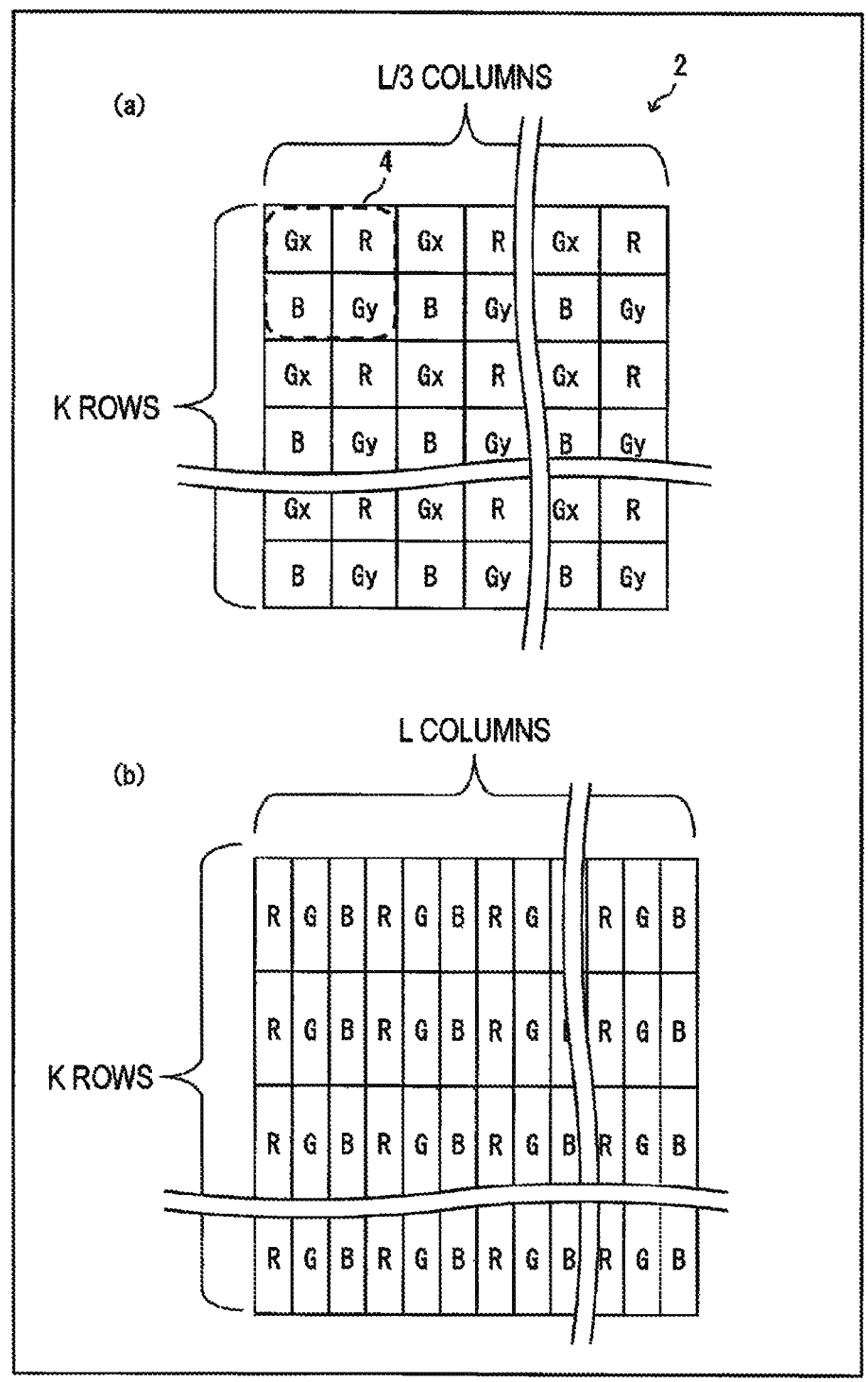
FIGS. 10(a) and 10(b) are diagrams illustrating pixel arrays of liquid crystal panels.
Figure 11:
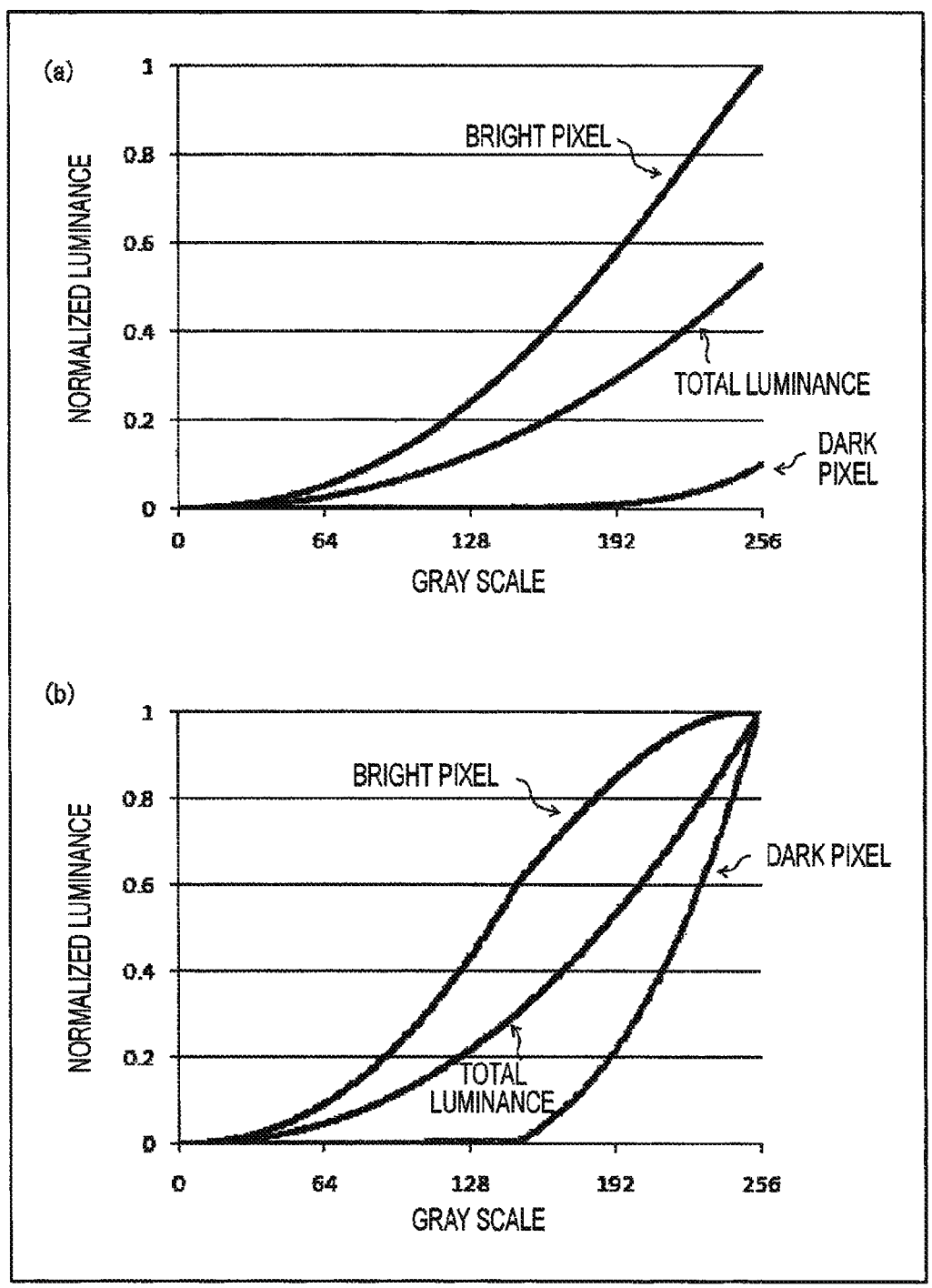
FIGS. 11(a) and 11(b) are graphs illustrating luminances of bright pixels and dark pixels.

FIG. 9 is a schematic diagrams illustrating the brightness of the pixels of the liquid crystal panel.

In the above description, although the brightness of the pixels has been described focusing on one pixel unit, as illustrated in FIG. 9, the whole liquid crystal panel 2 is configured so that, in the first field period (green display field), display can be obtained in which the bright pixels (pixels Gx and Gy) and the dark pixels (the pixels B and R) are disposed in the checkerboard pattern, and in the second field period (magenta display field), display can be obtained which has a checkerboard pattern obtained by inverting the first field.

As described above, the liquid crystal display device 1 controls the luminances of the pixels in the first and second field periods to display the image corresponding to the video data SID to be input of one frame.

Specifically, when the pixel data set DGxn is input as the video data to be input of the pixel Gx of a frame n, the pixel data set DGxn is displayed in the pixel Gx, as the luminance of the pixel Gx in the first field period of the frame n and the luminance of the pixel Gx in the second field period of the frame n, according to a gray scale of the pixel data set DGxn. Further, when pixel data set DBn is input as the video data to be input of a pixel Bx of the frame n, the pixel data set DBn is displayed in the pixel Bx, as the luminance of the pixel Bx in the first field period of the frame n and the luminance of the pixel Bx in the second field period of the frame n, according to a gray scale of the pixel data set DBn.

Similarly, when the pixel data set DGyn is input as the video data to be input of the pixel Gy of the frame n, the pixel data set DGyn is displayed in the pixel Gy, as the luminance of the pixel Gy in the first field period of the frame n and the luminance of the pixel Gy in the second field period of the frame n, according to a gray scale of the pixel data set DGyn. Further, when pixel data set DRn is input as the video data to be input of a pixel Rx of the frame n, the pixel data set DRn is displayed in the pixel Rx, as the luminance of the pixel Rx in the first field period of the frame n and the luminance of the pixel Rx in the second field period of the frame n, according to a gray scale of the pixel data set DRn FIGS. 10(a) and 10(b) are diagrams illustrating pixel arrays of liquid crystal panels, FIG. 10(a) illustrates a pixel array of the liquid crystal display device according to the present embodiment, and FIG. 10(b) illustrates a pixel array of a conventional liquid crystal display device.

As illustrated in FIG. 10(b), in a conventional liquid crystal panel having pixels arranged in an array of K rows×L columns, K green pixels G are arranged in picture elements (each including pixels R, G, and B) in one column, and L/3 green pixels G are arranged in picture elements in one row.

In contrast, as illustrated in FIG. 10(a), the liquid crystal panel 2 according to the present embodiment has pixels arranged in a Bayer array of K rows×L/3 columns, K green pixels G are arranged in the pixel units 4 in one column, and L/3 green pixels G are arranged in the pixel units in one row.

As described above, in the liquid crystal panel 2 according to the present embodiment having the pixels arranged in the Bayer array of K rows×L/3 columns, the pixel units in the rows and columns have green pixels which are equivalent in number to the conventional liquid crystal panel having the pixel array of K rows×L columns, and which are arranged vertically and horizontally.

Thus, the liquid crystal panel 2 including the pixels arranged in the Bayer array of K rows×L/3 columns can display an image having a resolution equivalent to that of the conventional liquid crystal panel including the pixels arranged in a stripe array of K rows by L columns. That is, the liquid crystal display device 1 according to the present embodiment allows a viewer to visually recognize an image having a resolution higher than that achieved by the actual number of pixels.

In other words, the liquid crystal display device 1 according to the present embodiment can substantially reduce the number of pixels required in order to display an image with a resolution equivalent to that of the conventional liquid crystal display device.

Further, in each pixel unit 4, the pixel Gx and the pixel B are connected to the same scanning signal line and the same data signal line, and the pixel R and the pixel Gy are connected to the same scanning signal line and the same data signal line. Thus, one pixel unit 4 only needs to use wiring required for substantially two pixels, and the liquid crystal display device 1 only requires substantially ⅙ of the number of pixels compared with the conventional liquid crystal display device.

Thus, the wiring or the like is readily installed in the liquid crystal panel, and a single scanning period is enough for a pixel charging period.

<Electric Potentials of Data Signal and Auxiliary Capacitor Line>

FIGS. 11(a) and 11(b) are graphs illustrating luminance of bright pixels and dark pixels, FIG. 11(a) illustrates luminances of the bright pixel and the dark pixel of the liquid crystal display device according to the present embodiment, and FIG. 11(b) illustrates luminances of a bright pixel and a dark pixel of the conventional liquid crystal display device. In FIGS. 11(a) and 11(b), the horizontal axes represent gray scale value of pixel data, and the vertical axes represent normalized luminance.

In the conventional liquid crystal display device, for wide viewing angle display, a technique of dividing one pixel into two sub-pixels (bright pixel and dark pixel) connected to the same scanning signal line and the same data signal line, and differing the luminances of the bright pixel and the dark pixel using the auxiliary capacitor line In such a liquid crystal display device, for high luminance display, an electric potential of the auxiliary capacitor line is set so that the luminance of the dark pixel matches the luminance of the bright pixel upon displaying maximum gray scale levels (256). Thus, the luminance of the dark pixel cannot be negligible within a considerable range of the gray scale. For example, in an example illustrated in FIG. 11(b), when a gray scale of not less than 192 gray scale levels is displayed, the luminance of the dark pixel is equal to or more than 20% of the luminance of the bright pixel.

In the liquid crystal display device 1 according to the present embodiment, the pixel displays different colors between the dark pixel and the bright pixel, and when the luminance of the dark pixel is set higher, color mixture (color crosstalk) is generated between the bright pixel and the dark pixel.

Thus, in order to inhibit color mixture between the bright pixel and the dark pixel, in the liquid crystal display device 1, voltage applied to the liquid crystal layer is set by adjusting a maximum value of the electric potential of the data signal and the electric potential of the auxiliary capacitor line so that the luminance of the dark pixel is not more than ¹⁄₁₀ of the luminance of the bright pixel, regardless of the gray scale of the pixel data (in particular, even if a white gray scale is displayed) as illustrated in FIG. 11(a). Therefore, the liquid crystal display device 1 is configured so that the viewer cannot visually confirm the color mixture.

Note that, although not illustrated, the maximum value of the electric potential of the data signal and the electric potential of the auxiliary capacitor line may be set so that the luminance of the dark pixel is not more than ¹⁄₁₀₀ of the luminance of the bright pixel (moreover, the luminance substantially equivalent to a dark luminance of the liquid crystal panel). Further, when the liquid crystal display device is used for, for example, outdoor imaging, where high luminance display is desired but precise color expression is not allowed, intrinsically the maximum value of the electric potential of the data signal and the electric potential of the auxiliary capacitor line may be set, so that the luminance of the dark pixel is approximately 20% of the luminance of the bright pixel to display the maximum gray scale levels (256). As described above, the maximum value of the electric potential of the data signal and the electric potential of the auxiliary capacitor line are desirably set according to the usage of the liquid crystal display device 1.

Second Embodiment

An embodiment of the present invention will be described in detail below based on FIG. 12.

In the above-mentioned first embodiment, the driving method performed upon supplying the video data SID to be input including the pixel data sets arranged in the Bayer array, to the input data processing circuit DPC.

In the following, description will be made of a driving method performed upon supply of video data SID to be input includes pixel data sets arranged in the stripe array.

FIG. 12 is a schematic diagram illustrating data processing in the input data processing circuit according to the present embodiment.

As illustrated in FIG. 12, the video data SID to be input includes a plurality of picture element data sets DEn arranged in a matrix, and each of the plurality of picture element data sets DEn includes pixel data sets a rn, gn, and dn.

The input data processing circuit DPC divides the video data SID to be input of one frame into two video data, and supplies, to the display control circuit DCC, each of the video data sets as video data for each field. At this time, from the video data SID to be input of one frame, the input data processing circuit DPC extracts pixel data set gn included in the picture element data sets DEn arranged in a checkerboard pattern, as the luminance information of pixels Gxn and Gyn for the first field, and extracts pixel data sets bn and rn included in the other picture element data sets DEn, as the luminance information of pixels Bn and Rn for the second field.

For example, the video data SID to be input of one frame including 16 picture element data sets of four rows×four columns will be supposed in which a picture element data set DE1 is disposed in the first row of the first column, a picture element data set DE2 is disposed in the second row of the first column, a picture element data set DE3 is disposed in the third row of the first column, a picture element data set DE4 is disposed in the fourth row of the first column, a picture element data set DE5 is disposed in the first row of the second column, a picture element data set DE6 is disposed in the second row of the second column, a picture element data set DE7 is disposed in the third row of the second column, a picture element data set DE8 is disposed in the fourth row of the second column, a picture element data set DE9 is disposed in the first row of the third column, a picture element data set DE10 is disposed in the second row of the third column, a picture element data set DE11 is disposed in the third row of the third column, a picture element data set DE12 is disposed in the fourth row of the third column, a picture element data set DE13 is disposed in the first row of the fourth column, a picture element data set DE14 is disposed in the second row of the fourth column, a picture element data set DE15 is disposed in the third row of the fourth column, and picture element data DE16 is disposed in the fourth row of the fourth column.

As illustrated in FIG. 12, the input data processing circuit DPC extracts pixel data sets g1, g3, g6, g8, g9, g11, g14, and g16 of the picture element data sets DE1, DE3, DE6, DE8, DE9, DE11, DE14, and DE16, and supplies the pixel data sets to the display control circuit DCC, defining the pixel data set g1 as a video data set for the pixel Gx of the pixel unit in the first row of the first column of the first field, the pixel data set g3 as a video data set for the pixel Gx of the pixel unit in the second row of the first column of the first field, the pixel data set g6 as a video data set for the pixel Gy of the pixel unit in the first row of the first column of the first field, the pixel data set g8 as a video data set for the pixel Gy of the pixel unit in the second row of the first column of the first field, the pixel data set g9 as a video data set for the pixel Gx of the pixel unit in the first row of the second column of the first field, the pixel data set g11 as a video data set for the pixel Gx of the pixel unit in the second row of the second column of the first field, the pixel data set g14 as a video data set for the pixel Gy of the pixel unit in the first row of the second column of the first field, and the pixel data set g16 as a video data set for the pixel Gy of the pixel unit in the second row of the second column of the first field.

Further, the input data processing circuit DPC extracts pixel data sets b2, b4, r5, r7, b10, b12, r13, and r15 of the picture element data sets DE2, DE4, DE5, DE7, DE10, DE12, DE13, and DE15, and supplies the pixel data sets to the display control circuit DCC, defining the pixel data set b2 as a video data set for the pixel B of the pixel unit in the first row of the first column of the second field, the pixel data set b4 as a video data set for the pixel B of the pixel unit in the second row of the first column of the second field, the pixel data set r5 as a video data set for the pixel R of the pixel unit in the first row of the first column of the second field, the pixel data set r7 as a video data set for the pixel R of the pixel unit in the second row of the first column of the second field, the pixel data set b10 as a video data set for the pixel B of the pixel unit in the first row of the second column of the second field, the pixel data set b12 as a video data set for the pixel B of the pixel unit in the second row of the second column of the second field, the pixel data set r13 as a video data set for the pixel R of the pixel unit in the first row of the second column of the second field, and the pixel data set r15 as a video data set for the pixel R of the pixel unit in the second row of the second column of the second field.

Therefore, similar to the first embodiment, the liquid crystal display device 1 controls the luminances of the pixels in the field periods to display the image corresponding to the video data SID to be input of one frame.

Further, in consideration of green (in charge of resolution) and red and blue (in charge of color balance), the pixel data sets g1 and g6 of the picture element data sets DE1 and DE6 are directly used, but the pixel data sets b2, r2, b6, and r6 of the picture element data sets DE2 and DE6 may be averaged using data of four to eight pixels in the neighborhood thereof to obtain pixel data sets b2', r2', b6', and r6' for use as the video data for the fields.

For example, pixel data set b10' of picture element data set DE10' may be calculated as follows: $b10'=(4 \times b10+b6+b9+b11+b14)/8$. As a matter of course, a calculation method is not limited to the above formula. Note that, in the above formula, b10', b10, b6, b9, b11, and b14 represent luminance of the pixel data set.

Further, green is strongly in charge of resolution, but processing such as averaging undesirably eliminates precision, and thus, the green is recommended to be used directly.

According to the configuration described above, the liquid crystal display device according to the present embodiment can display an image based on video data generally used for TV broadcasting.

Figure 13:
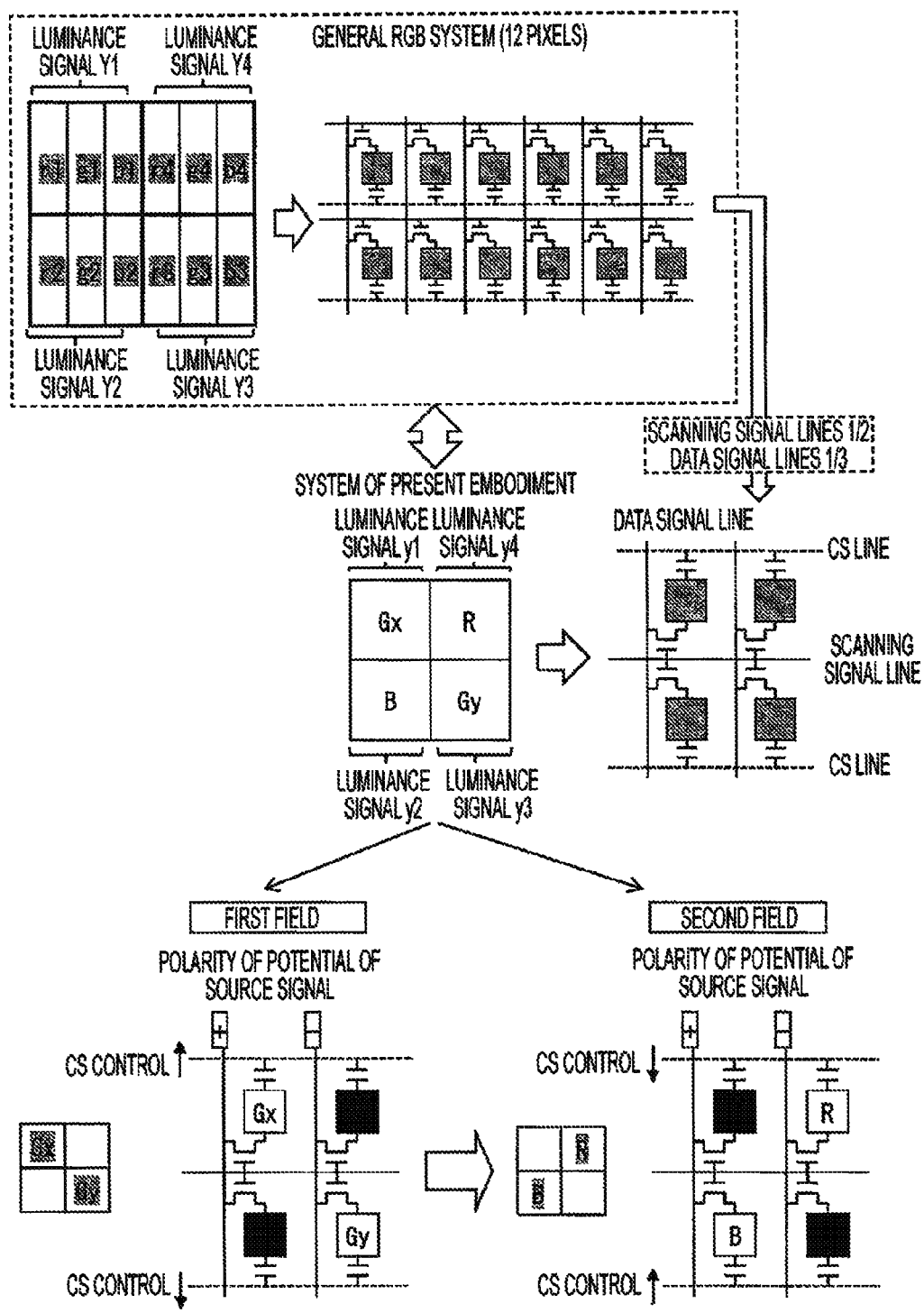
FIG. 13 is conceptual diagrams illustrating a display method of a liquid crystal display device according to the second embodiment, and a display method of a conventional liquid crystal display device, where video data to be input is supplied, the video data including pixel data sets arranged in a stripe array.

FIG. 13 is conceptual diagrams illustrating a display method of the liquid crystal display device according to the present embodiment, and a display method of the conventional liquid crystal display device, where video data to be input is supplied, the video data including pixel data sets arranged in the stripe array.

As illustrated in FIG. 13, when a luminance signal Y1 (picture element data), a luminance signal Y2 (picture element data), a luminance signal Y3 (picture element data), and a luminance signal Y4 (picture element data) are supplied in an array of two rows×two columns, as the video data of one frame transmitted from outside, the conventional liquid crystal display device provides display using 12 pixels, based on 12 pixel data sets (r1 to r4, g1 to g4, b1 to b4) included in the luminance signals Y1 to Y4. In this configuration, two scanning signal lines and six data signal lines are required.

In contrast, in the liquid crystal display device according to the present embodiment, when the luminance signals Y1 to Y4 are supplied in an array of two rows×two columns from outside, the pixel data set g1 is extracted from the luminance signal Y1 to be defined as a luminance signal y1 of the pixel Gx, the pixel data set b2 is extracted from the luminance signal Y2 to be defined as a luminance signal y2 of the pixel B, the pixel data set g3 is extracted from the luminance signal Y3 to be defined as a luminance signal y3 of the pixel Gy, the pixel data set r4 is extracted from the luminance signal Y4 to be defined as a luminance signal y4 of the pixel R, and further, the one frame period is displayed divided into the first field period and the second field period. In this configuration, one scanning signal line and two data signal lines are required. Thus, the number of scanning signal lines is reduced to ½, and the number of data signal lines is reduced to ⅓, compared with the conventional liquid crystal display device.

Third Embodiment

Another embodiment according to the present invention will be described below based on FIG. 14.

The liquid crystal display device according to the present embodiment is different from the liquid crystal display device according to the first embodiment in control of lighting timing of a backlight.

Figure 14:
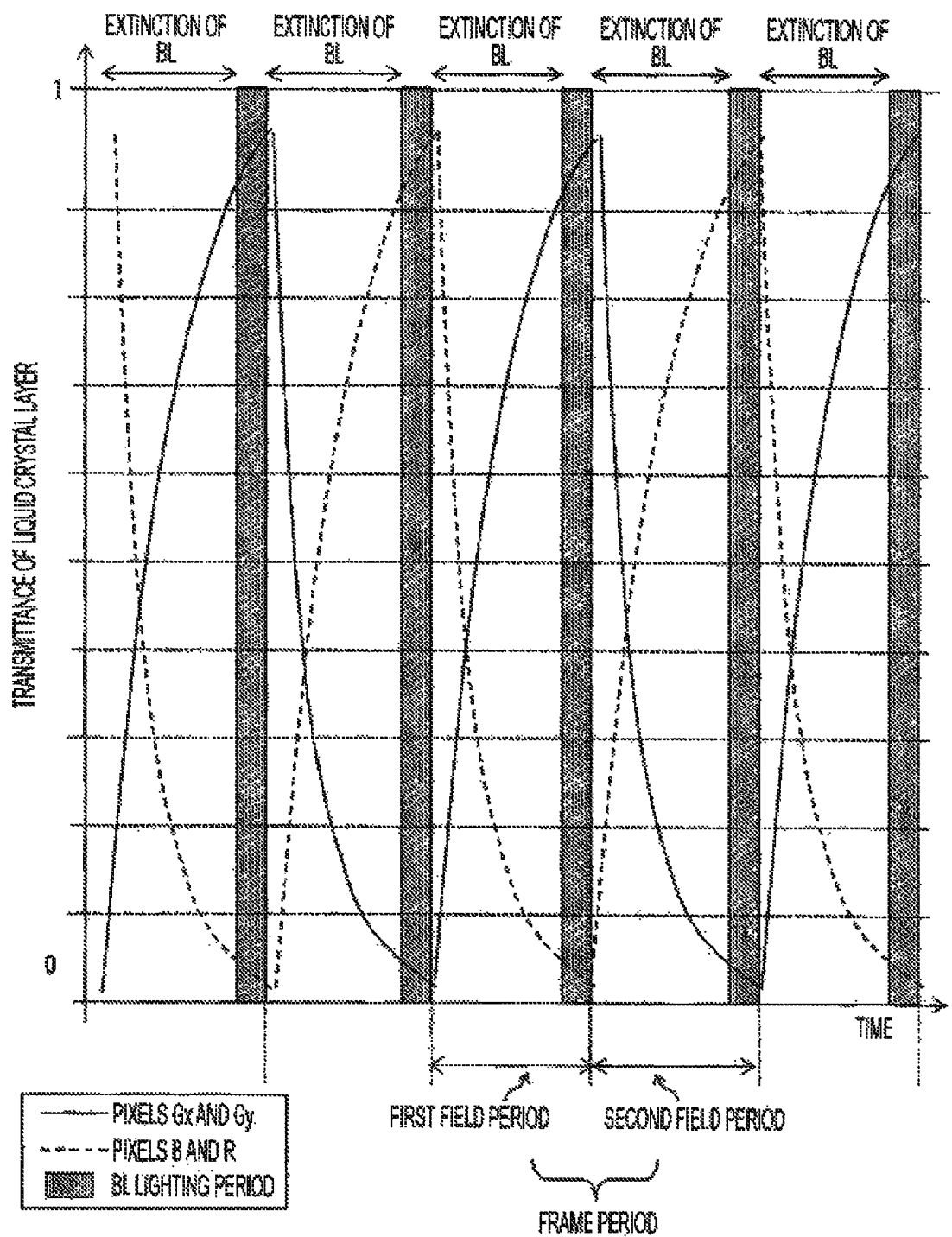
FIG. 14 is a timing chart illustrating a relationship between transmittance of a liquid crystal layer and lighting timing of a backlight according to a third embodiment.

FIG. 14 is a timing chart illustrating a relationship between transmittance of the liquid crystal layer and the lighting timing of the backlight according to the present embodiment. In FIG. 14, the horizontal axis represents time, and the vertical axis represents the transmittance of the liquid crystal layer.

As described in the first embodiment, the maximum value of the electric potential of the data signal and the electric potential of the auxiliary capacitor line are appropriately set to adjust the luminance of the bright pixel and the luminance of the dark pixel. Therefore, at the completion of liquid crystal response in the field periods, transmittance of the dark pixel can be not more than 1/100 of transmittance of the bright pixel.

As illustrated in FIG. 14, the liquid crystal display device according to the present embodiment reduces a lighting time of the backlight in the field periods to be less than ½ of the field period, and lights the backlight at time when the liquid crystal response of the whole liquid crystal panel is substantially completed (the transmittance of the bright pixel is not less than 20 times of the transmittance of the dark pixel), after the end of scanning by the scanning signal line. Then, in the next field period, the backlight is extinguished at time when the scanning is started by the scanning signal line. The turning on and off of the backlight are repeated to prevent color crosstalk.

Fourth Embodiment

Another embodiment according to the present invention will be described below based on FIG. 15.

FIG. 15 is a plan view illustrating the liquid crystal panel and the backlight according to the present embodiment.

The liquid crystal display device according to the present embodiment divides the backlight 3 into a plurality of areas vertically arranged, and sequentially scans lighting positions for each area in each field period.

In an example illustrated in FIG. 15, the backlight 3 is divided into a lighting area AR1, a lighting area AR2, a lighting area AR3, and a lighting area AR4. The liquid crystal display device according to the present embodiment can individually control the lighting of the backlight 3 for the lighting areas AR1 to AR4, by supplying the control signal from the display control circuit DCC to the backlight 3.

In order to perform such control, a backlight having direct-type LEDs arranged in a matrix may be used to individually control the lighting of the LEDs disposed in the lighting areas. Further, a backlight including a plurality of light guides arranged in a row direction may be used to individually input light to the light guides.

When the liquid crystal panel 2 is divided into a plurality of areas (panel areas) according to the lighting areas AR1 to AR4 of the backlight 3, the lighting area AR1 is disposed opposite to a panel area ar1 of the liquid crystal panel 2, the lighting area AR2 is disposed opposite to a panel area ar2, the lighting area AR3 is disposed opposite to a panel area ar3, and the lighting area AR4 is disposed opposite to a panel area ar4.

In the liquid crystal display device according to the present embodiment, the backlight 3 is controlled to light the lighting area AR1 arranged opposite to the panel area ar1, at time when the transmittance of the bright pixel in the panel area ar1 is not less than 20 times of the transmittance of the dark pixel. Then, in the next field period, the lighting area AR1 is extinguished at time when the scanning is started by the scanning signal line. Next, the backlight 3 is controlled to light the lighting area AR2 arranged opposite to the panel area ar2, at time when the transmittance of the bright pixel in the panel area ar2 is not less than 20 times of the transmittance of the dark pixel. The turning on and off of the lighting are sequentially repeated for each lighting area to prevent color crosstalk.

The liquid crystal display device according to the present embodiment can control the backlight 3 to be lit for each lighting area, without waiting for the liquid crystal response in all pixels of the liquid crystal panel 2. Thus, a lighting period of the backlight 3 can be extended, compared with the liquid crystal display device according to the third embodiment. Thus, an excessive increase of the luminance of the backlight 3, or high-speed drive of the scanning signal line for securing a time to write the data signal to the pixel electrode is not required to emit light having sufficient luminance to the liquid crystal panel 2 while reducing a load on the system.

Fifth Embodiment

Another embodiment according to the present invention will be described below based on FIG. 16.

Figure 16:
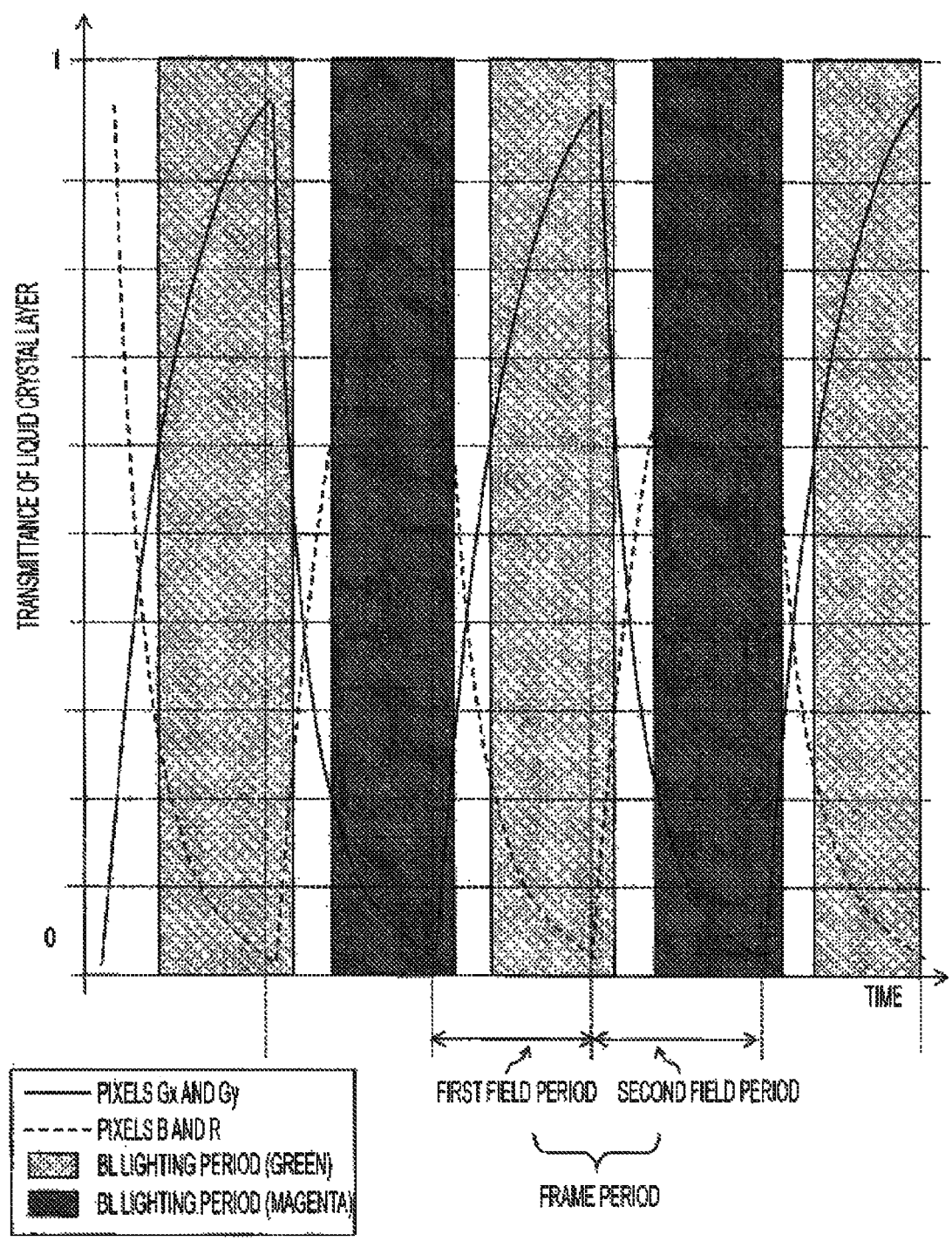
FIG. 16 is a timing chart illustrating a relationship between liquid crystal response speed and lighting timing of a backlight according to a fifth embodiment.

FIG. 16 is a timing chart illustrating a relationship between liquid crystal response speed and the lighting timing of a backlight according to the present embodiment.

In the liquid crystal display device according to the present embodiment, the backlight 3 includes a green light source and a magenta light source, and is controlled to emit light from the green light source in the first field period in which the pixels Gx and Gy are defined as the bright pixel, and emit light from the magenta light source in the second field period in which the pixels B and R are defined as the bright pixel.

Specifically, in the first field period, the green light source is lit, at time when the liquid crystal response is completed to some extent (e.g., at time when transmittance of the pixels Gx and Gy is not less than twice of transmittance of the pixels B and R). Further, in the next second field period, the green light source is extinguished, at time when the transmittance of the pixels Gx and Gy is not more than twice of the transmittance of the pixels B and R.

Further, in the second field period, the magenta light source is lit, at time when the liquid crystal response is completed to some extent (e.g., at time when the transmittance of the pixels B and R is not less than twice of the transmittance of the pixels Gx and Gy). Further, in the next first field period, the magenta light source is extinguished, at time when the transmittance of the pixels B and R is not more than twice of the transmittance of the pixels Gx and Gy. The backlight repeats the operation described above.

Green light hardly passes through a blue or red color filter provided at the pixel B or the pixel R (dark pixel in the first field period), and magenta (red, blue) light hardly passes through a green color filter provided at the pixels Gx and Gy (dark pixel in the second field period). Accordingly, the liquid crystal display device according to the present embodiment can almost prevent color crosstalk.

As in the third embodiment, when the maximum value of the electric potential of the data signal and the electric potential of the auxiliary capacitor line are set so that the luminance of the bright pixel is not less than 20 times of the luminance of the dark pixel, at the completion of the liquid crystal response, the luminance of the whole liquid crystal panel is reduced. Although there is a method of designing a liquid crystal layer capable of achieving high transmittance at low voltage to solve this problem, the method provides a cell having an increased thickness or liquid crystal having an increased viscosity in this case, and the liquid crystal response speed is unfortunately reduced.

In contrast, in the liquid crystal display device according to the present embodiment, the maximum value of the electric potential of the data signal and the electric potential of the auxiliary capacitor line do not need to be set so that the luminance of the bright pixel is not less than 20 times of the luminance of the dark pixel in order to prevent the color crosstalk. Thus, transmittance of liquid crystal can be improved.

Note that the liquid crystal display device according to the present embodiment enables colored display, even if the liquid crystal panel does not include the color filter.

Sixth Embodiment

Another embodiment according to the present invention will be described below.

Similar to the liquid crystal display device according to the fifth embodiment, in the liquid crystal display device according to the present embodiment, the backlight includes the green light source and the magenta light source, and is controlled to light the green light source in the first field period, and the magenta light source in the second field period. Further, similar to the liquid crystal display device according to the fourth embodiment, the liquid crystal display device according to the present embodiment sequentially scans lighting positions for each lighting area of the backlight in each field period.

Therefore, the lighting period of the backlight can be fully secured while preventing the color crosstalk.

CONCLUSION

According to a first aspect of the present invention, a liquid crystal display device includes a direct-view liquid crystal panel (2) having a Bayer array of green first and third pixels (pixel Gx and pixel Gy), and a blue second pixel (pixel B) and a red fourth pixel (pixel R), the first pixel is connected to a first scanning signal line (Gn) and a first data signal line (Sm) through a first transistor (5a), and the second pixel is connected to the first scanning signal line and the first data signal line through a second transistor (5b).

According to the configuration described above, the pixels are arranged in the Bayer array, and display can be achieved with a reduced number of pixels without reducing the resolution, compared with a liquid crystal display device having a stripe array. Further, the first pixels and the second pixels are connected to the same scanning signal line, and thus, the number of scanning signal lines can be reduced in the whole liquid crystal panel.

According to a second aspect of the present invention, the liquid crystal display device in the first aspect may be configured so that the third pixel is connected to the first scanning signal line and a second data signal line (Sm+1) through a third transistor (5c), and the fourth pixel is connected to the first scanning signal line and the second data signal line through a fourth transistor (5d).

According to a third aspect of the present invention, the liquid crystal display device in the first or second aspect may be configured so that the first pixel forms an auxiliary capacitor with a first auxiliary capacitor line (CSn), the second pixel forms an auxiliary capacitor with a second auxiliary capacitor line (CSn+1), luminance of the first pixel is higher than luminance of the second pixel in a first field period, the luminance of the second pixel is higher than the luminance of the first pixel in a second field period, and the first field period and the second field period are alternately displayed repeatedly.

According to the configuration described above, the luminances of the first and second pixels connected to the same scanning signal line and the same data signal line can be individually controlled. Thus, the resolution can be improved relative to the number of scanning signal lines.

According to a fourth aspect of the present invention, the liquid crystal display device in the third aspect may be configured so that the third pixel forms an auxiliary capacitor with the second auxiliary capacitor line, the fourth pixel forms an auxiliary capacitor with the first auxiliary capacitor line, luminance of the third pixel is higher than luminance of the fourth pixel in the first field period, and the luminance of the fourth pixel is higher than the luminance of the third pixel in the second field period.

According to the configuration described above, the luminances of the third and fourth pixels connected to the same scanning signal line and the same data signal line can be individually controlled. Thus, the resolution can be improved relative to the number of scanning signal lines.

According to a fifth aspect of the present invention, the liquid crystal display device in the fourth aspect may be configured so that one frame is divided into the first and the second fields, a video data set of the first pixel of the frame is displayed as the luminance of the first pixel in the first field period and the luminance of the first pixel in the second field period, a video data set of the second pixel of the frame is displayed as the luminance of the second pixel in the first field period and the luminance of the second pixel in the second field period, a video data set of the third pixel of the frame is displayed as the luminance of the third pixel in the first field period and the luminance of the third pixel in the second field period, and a video data set of the fourth pixel of the frame is displayed as the luminance of the fourth pixel in the first field period and the luminance of the fourth pixel in the second field period.

According to a sixth aspect of the present invention, the liquid crystal display device in any of the third to fifth aspects may be configured so that, in the first field period, the luminance of the second pixel is not more than $\frac{1}{10}$ of the luminance of the first pixel, and in the second field period, the luminance of the first pixel is not more than $\frac{1}{10}$ of the luminance of the second pixel.

According to the configuration described above, in the first field period, the luminance of the second pixel is sufficiently lower than the luminance of the first pixel, in the second field period, the luminance of the first pixel is sufficiently lower than the luminance of the second pixel. Thus, the color mixture (color crosstalk) can be inhibited.

According to a seventh aspect of the present invention, the liquid crystal display device in any of the third to sixth aspects further incudes a backlight (3) arranged opposite to the liquid crystal panel, the backlight repeats lighting and extinction corresponding to cycles in which the first and second field periods are alternately repeated, the backlight is lit in a period in which transmittance of a liquid crystal layer of the first pixel is not less than 20 times of transmittance of a liquid crystal layer of the second pixel in the first field period, and the backlight is lit in a period in which the transmittance of the liquid crystal layer of the second pixel is not less than 20 times of the transmittance of the liquid crystal layer of the first pixel in the second field period.

According to the configuration described above, a light intensity emitted to the second pixel can be reduced in the first field period, and a light intensity emitted to the first pixel can be reduced in the second field period. Thus, the color mixture (color crosstalk) can be inhibited.

According to an eighth aspect of the present invention, the liquid crystal display device in the seventh aspect may be configured so that the backlight includes a plurality of lighting areas (AR1 to AR4) individually lit and extinguished, the backlight emits light from a lighting area opposite to the first pixel in a period in which the transmittance of the liquid crystal layer of the first pixel is not less than 20 times of the transmittance of the liquid crystal layer of the second pixel, in the first field period, and the backlight emits light from a lighting area opposite to the second pixel in a period in which the transmittance of the liquid crystal layer of the second pixel is not less than 20 times of the transmittance of the liquid crystal layer of the first pixel, in the second field period.

According to the configuration described above, the lighting period of the backlight can be extended without waiting for the liquid crystal response in all pixels of the liquid crystal panel. Thus, the excessive increase of the luminance of the backlight is not required, or high-speed scanning by the scanning signal line for securing a time to write the data signal to the pixel electrode is not required, to emit light having sufficient luminance to the liquid crystal panel while reducing a load on the system.

According to a ninth aspect of the present invention, the liquid crystal display device in any of the third to sixth aspects further includes a backlight disposed opposite to the liquid crystal panel, the backlight may be configured to emit green light corresponding to the repeated cycles of the first field period, and to emit magenta light corresponding to the repeated cycles of the second field period.

According to the configuration described above, the color mixture can be inhibited without strictly setting the transmittance of the liquid crystal layer of the first pixel and the transmittance of the liquid crystal layer of the second pixel.

According to a tenth aspect of the present invention, the liquid crystal display device in the ninth aspect may be configured so that the backlight emits green light in a period in which the transmittance of the liquid crystal layer of the first pixel is not less than twice of the transmittance of the liquid crystal layer of the second pixel in the first field period, and the backlight emits magenta light in a period in which the transmittance of the liquid crystal layer of the second pixel is not less than twice of the transmittance of the liquid crystal layer of the first pixel in the second field period.

According to the configuration described above, the color mixture can be further inhibited without strictly setting the transmittance of the liquid crystal layer of the first pixel and the transmittance of the liquid crystal layer of the second pixel.

According to an eleventh aspect of the present invention, the liquid crystal display device in the ninth or tenth aspect may be configured so that the backlight includes a plurality of lighting areas individually lit and extinguished, the backlight emits green light from a lighting area opposite to the first pixel in a period in which the transmittance of the liquid crystal layer of the first pixel is not less than 20 times of the transmittance of the liquid crystal layer of the second pixel in the first field period, and the backlight emits magenta light from a lighting area opposite to the second pixel in a period in which the transmittance of the liquid crystal layer of the second pixel is not less than 20 times of the transmittance of the liquid crystal layer of the first pixel in the second field period.

The present invention is not limited to the description of the embodiments, but can be altered in many ways by a person skilled in the art within the scope of the claims. An embodiment derived from a proper combination of technical means disclosed in different embodiments is also encompassed in the technical scope of the present invention. In addition, a new technical feature can be obtained by combining together the technical means disclosed in the embodiments.

INDUSTRIAL APPLICABILITY

The present invention can be employed for a liquid crystal display device.

REFERENCE SIGNS LIST 1 liquid crystal display device
2 liquid crystal panel
3 backlight
5a transistor (first transistor)
5b transistor (second transistor)
5c transistor (third transistor)
5d transistor (fourth transistor)
AR1 to AR4 lighting area
CSa to CSd auxiliary capacitor
Gxn pixel (first pixel)
Bn pixel (second pixel)
Gyn pixel (third pixel)
Rn pixel (fourth pixel)
Sm data signal line (first data signal line)
Sm+1 data signal line (second data signal line)
Gn scanning signal line (first scanning signal line)
Gn+1 scanning signal line (second scanning signal line)
Csn auxiliary capacitor line (first auxiliary capacitor line)
Csn+1 auxiliary capacitor line (second auxiliary capacitor line)

The invention claimed is:
1. A liquid crystal display device comprising a direct-view liquid crystal panel having a Bayer array of green first and third pixels, and a blue second pixel and a red fourth pixel, the first pixel being connected to a first scanning signal line and a first data signal line through a first transistor, the second pixel being connected to the first scanning signal line and the first data signal line through a second transistor;
wherein the first pixel forms an auxiliary capacitor with a first auxiliary capacitor line, and the second pixel forms an auxiliary capacitor with a second auxiliary capacitor line;

a luminance of the first pixel is higher than a luminance of the second pixel in a first field period, the luminance of the second pixel is higher than the luminance of the first pixel in a second field period;

wherein the first field period and the second field period are alternately displayed repeatedly;

wherein in the first field period, a luminance of the second pixel is not more than 1/10 of the luminance of the first pixel; and wherein in the second field period, a luminance of the first pixel is not more than 1/10 of the luminance of the second pixel.

2. The liquid crystal display device according to claim 1, wherein
the third pixel is connected to the first scanning signal line and a second data signal line through a third transistor, and the fourth pixel is connected to the first scanning signal line and the second data signal line through a fourth transistor.

3. The liquid crystal display device according to claim 1, wherein
the third pixel forms an auxiliary capacitor with the second auxiliary capacitor line, and the fourth pixel forms an auxiliary capacitor with the first auxiliary capacitor line,
a luminance of the third pixel is higher than a luminance of the fourth pixel in the first field period, and the luminance of the fourth pixel is higher than the luminance of the third pixel in the second field period.

4. The liquid crystal display device according to claim 3, wherein
one frame is divided into the first and the second fields,
a video data set of the first pixel of the frame is displayed as the luminance of the first pixel in the first field period and the luminance of the first pixel in the second field period,
a video data set of the second pixel of the frame is displayed as the luminance of the second pixel in the first field period and the luminance of the second pixel in the second field period,
a video data set of the third pixel of the frame is displayed as the luminance of the third pixel in the first field period and the luminance of the third pixel in the second field period, and
a video data set of the fourth pixel of the frame is displayed as the luminance of the fourth pixel in the first field period and the luminance of the fourth pixel in the second field period.

5. The liquid crystal display device according to claim 1, further comprising a backlight arranged opposite to the liquid crystal panel,
the backlight repeating lighting and extinction corresponding to cycles in which the first and second field periods are alternately repeated, the backlight being lit in a period in which transmittance of a liquid crystal layer of the first pixel is not less than 20 times of transmittance of a liquid crystal layer of the second pixel in the first field period, the backlight being lit in a period in which the transmittance of the liquid crystal layer of the second pixel is not less than 20 times of the transmittance of the liquid crystal layer of the first pixel in the second field period.

6. The liquid crystal display device according to claim 5, wherein
the backlight includes a plurality of lighting areas individually lit and extinguished,
the backlight emits light from a lighting area opposite to the first pixel in a period in which the transmittance of the liquid crystal layer of the first pixel is not less than 20 times of the transmittance of the liquid crystal layer of the second pixel, in the first field period, and the backlight emits light from a lighting area opposite to the second pixel in a period in which the transmittance of the liquid crystal layer of the second pixel is not less than 20 times of the transmittance of the liquid crystal layer of the first pixel, in the second field period.

7. The liquid crystal display device according to claim 1, further comprising a backlight disposed opposite to the liquid crystal panel,
the backlight emitting green light corresponding to the repeated cycles of the first field period, and emitting magenta light corresponding to the repeated cycles of the second field period.

8. The liquid crystal display device according to claim 7, wherein
the backlight emits green light in a period in which the transmittance of the liquid crystal layer of the first pixel is not less than twice of the transmittance of the liquid crystal layer of the second pixel in the first field period, and the backlight emits magenta light in a period in which the transmittance of the liquid crystal layer of the second pixel is not less than twice of the transmittance of the liquid crystal layer of the first pixel in the second field period.

9. The liquid crystal display device according to claim 7, wherein
the backlight includes a plurality of lighting areas individually lit and extinguished,
the backlight emits green light from a lighting area opposite to the first pixel in a period in which the transmittance of the liquid crystal layer of the first pixel is not less than 20 times of the transmittance of the liquid crystal layer of the second pixel in the first field period, and the backlight emits magenta light from a lighting area opposite to the second pixel in a period in which the transmittance of the liquid crystal layer of the second pixel is not less than 20 times of the transmittance of the liquid crystal layer of the first pixel in the second field period.

10. The liquid crystal display device according to claim 1, wherein the first data signal line connected to each first pixel and each second pixel in a pixel column through a separate transistor.

* * * * *